US007356393B1

(12) United States Patent
Schlatre et al.

(10) Patent No.: US 7,356,393 B1
(45) Date of Patent: Apr. 8, 2008

(54) INTEGRATED SYSTEM FOR ROUTINE MAINTENANCE OF MECHANIZED EQUIPMENT

(75) Inventors: Larry Schlatre, Baton Rouge, LA (US); Alan Colby, Baton Rouge, LA (US)

(73) Assignee: Turfcentric, Inc., Baton Rouge, LA (US)

( * ) Notice: Subject to any disclaimer, the term of this patent is extended or adjusted under 35 U.S.C. 154(b) by 448 days.

(21) Appl. No.: 10/713,300

(22) Filed: Nov. 14, 2003

Related U.S. Application Data

(60) Provisional application No. 60/427,289, filed on Nov. 18, 2002.

(51) Int. Cl.
*G06F 7/00* (2006.01)
*G06F 19/00* (2006.01)
(52) U.S. Cl. .............................. 701/33; 701/29; 701/30; 701/36; 340/438; 340/439
(58) Field of Classification Search .................. 701/29, 701/30–33, 36; 340/425.5, 438, 439
See application file for complete search history.

(56) References Cited

U.S. PATENT DOCUMENTS

| | | | |
|---|---|---|---|
| 5,657,224 | A | 8/1997 | Lonn et al. |
| 6,339,736 | B1 | 1/2002 | Moskowitz et al. |
| 6,370,454 | B1 | 4/2002 | Moore |
| 6,611,755 | B1 * | 8/2003 | Coffee et al. ............... 701/213 |
| 2004/0138790 | A1 * | 7/2004 | Kapolka et al. .............. 701/29 |

OTHER PUBLICATIONS

"John Deere and InCircuit: A Winning Combination", Aug. 18, 2000.
"Agreement Between InCircuit Development Corp. and Larry Schlatre" Aug. 18, 2000.
Consulting invoices between Incircuit and Sclatre dated Mar. 2000 to Aug. 2000.
"An Overview of Grounds Maintenance Software @ Quail West Golf Maintenance", Aug. 18, 2000.
"License and Distribution Agreement between InCircuit Development Corporation and The Toro Company", Aug. 18, 2000.
"Agreement to Not Disclose Deere's of Second Party's Propritary Information", Aug. 18, 2000.

* cited by examiner

*Primary Examiner*—Gertrude A. Jeanglaude
(74) *Attorney, Agent, or Firm*—Jones, Walker, Waechter, Poitevent, Carrere & Denegre, L.L.P.

(57) ABSTRACT

An apparatus and method for managing the preventative maintenance requirements and unscheduled repairs on a fleet of vehicles. The apparatus includes a computer system having a host processor and a database accessible by the host processor, and at least one maintenance response station communicating with the host processor. The database contains vehicle specific maintenance schedules indicating recommended maintenance intervals for scheduled maintenance, where each scheduled maintenance has associated maintenance tasks. The method involves periodically receiving signals at the host processor containing maintenance trigger data associated with a specific vehicle in the fleet of vehicles, comparing the received maintenance trigger data to maintenance schedule data contained in the database, and for each comparison, determining whether maintenance is indicated, and if so, identifying the vehicle at a vehicle response station.

21 Claims, 18 Drawing Sheets

| (E5500-B) Reelmaster 5500-D | |
|---|---|
| Today's Date: Tuesday, November 26, 2002 | Current Meter: 1454 Hr |

Service Requirements:

| Service Description | Next Maint Meter/Date |
|---|---|
| ☑ Adjust Valves | 800 |
| ☑ Change Engine Oil | 50 |
| ☑ Change Hydraulic Fluid | 800 |
| ☑ Change Rear Axle Lubricant (4WD | 800 |
| ☑ Check Battery Cable Connections | 50 |
| ☑ Check Battery Electrolyte Level | 50 |
| ☑ Check Engine RPM (Idle & Full Thr | 400 |
| ☑ Check Fan and Alternator Belt Ten | 100 |

| Create WO | Snooze | Main |
|---|---|---|

Figure 2: Screen shot of a particular PM Alert for selected equipment E5500-B Reelmaster

```
(E5500-B) Reelmaster 5500-D                    WO# 1145
Viewing Services  View Parts  View Labor    Print
┌Service─────────────────────────────────────────┐
│ ☑ Change Engine Oil                            │
│ ☑ Check Battery Cable Connections              ▲
│ ☑ Check Battery Electrolyte Level              
│ ☑ Check Fan and Alternator Belt Tension        
│ ☑ Check Reel Bearing Preload                   
│ ☑ Drain Moisture-Fuel Tank                     
│ ☑ Drain Moisture-Hydraulic. Tank               ▼
│ ☑ Inspect Air Filter, Dust Cup and Baffle      
│ ☑ Inspect Cooling System Hoses                 
└────────────────────────────────────────────────┘
              Add
  Close WO  Scheduled    Add      Main
              Service   Repair
```

Figure 3: View In Progress: Details of Work Order number 1145 (Work Order Detail)

```
(E5500-B) Reelmaster 5500-D                    WO# 1145
V (E5500-B) Reelmaster 5500-D                          t
  Enter repair description:
 s
  ┌────────────────────────────────────────────┐
  │ REPAIR DAMAGED TIRE                        │
  │                                            │
  │                                            │
  │      ┌──────────────────────────────┐      │
  │      │   CLEAR  │ BACKSPACE │ 1│2│3 │      │
  │      │ A│B│C│D│E│F│G│H│ I │J│ 4│5│6 │      │
  │      │ K│L│M│N│O│P│Q│ R │S│T│ 7│8│9 │      │
  │      │ U│V│W│  SPACE  │X│Y│Z│ -│0│. │      │
  │      └──────────────────────────────┘      │
  │                                            │
  │           OK        │     Cancel           │
  └────────────────────────────────────────────┘
```

Figure 4: View In Progress: View Services: Add Repair

```
(E5500-B) Reelmaster 5500-D              WO# 1145
View Services│Viewing Parts│View Labor    Print
 Inventory Part              │Quantity │Type
 ☑ () (86-6110) FILTER - ELEMENT   1 ▲▽  PM Cost of misc. parts used:  PM   $0.00   Repair      n/a ┌─────────┐                      
      │Close WO │     Add Part       Main
      └─────────┘
```

Figure 5: View In Progress: View Parts

```
(E5500-B) Reelmaster 5500-D              WO# 1145
View Services│View Parts│Viewing Labor    Print
 Employee    Adding Labor:
 ☑ Kenned
             Employee: Schlatre, Larry   ▼
             Rate:     Regular           ▼
             Minutes:  15  ▲▽

Done       Cancel

Close WO       Add Labor       Main
```

Figure 6: View In Progress: View Labor: Add Labor

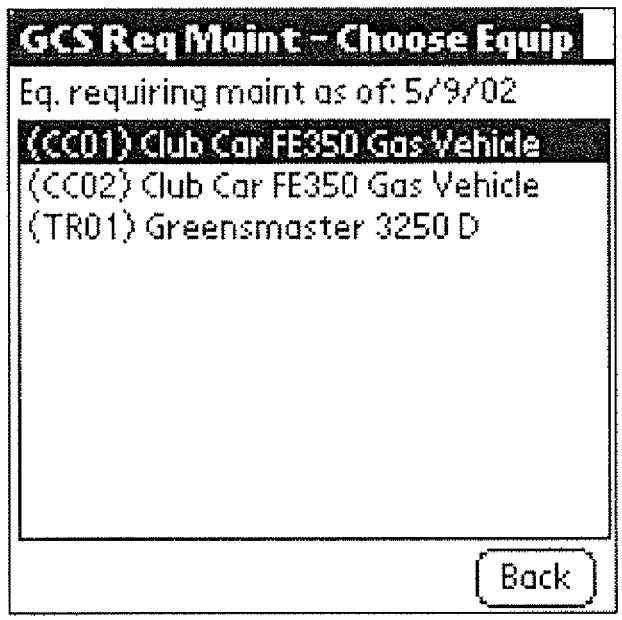
FIGURE 7 pick list of maintenance equipment
FIGURE 8 Required Maintenance: View Service

Figure 9  Equipment Work Orders: All Open (Fleet)
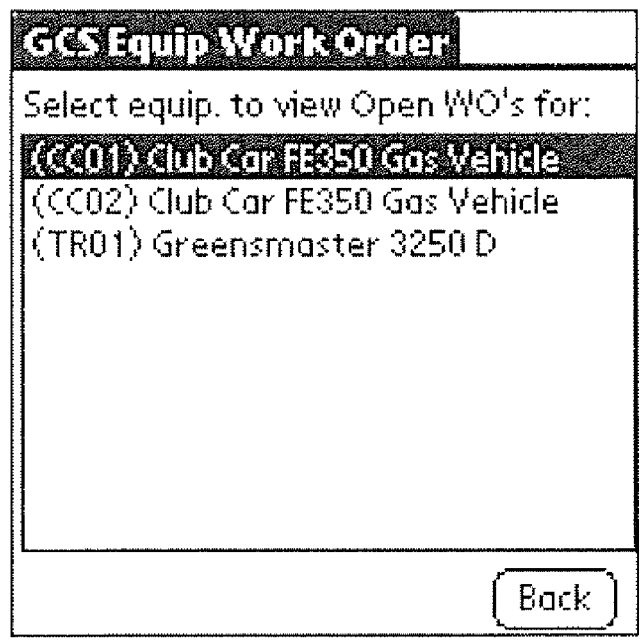
Figure 10- Inventory: Main

Figure 11 - Inventory: Create Item

```
GCS Inventory - Create New
Stock #: ................................
Desc: ................................
       ................................
Barcode: ................................
Grp/Sub: ▼ Parts/Other Parts
SKU: ▼ EA
Qty on hand: ......1      [▲]
                          [▼]
☑ Print Barcode
[ Create ]              [ Back ]
```

Figure 12 - Inventory: Details (Scan Item)

```
GCS Inventory - Item Details
(11223) SEAL

Location: A1-01
Grp/Sub: Parts/Bearings/Seals
Vendor:  Napa
Vnd Pt#: 11223-NAPA

Qty on hand: 17 EA            [▲]
New Qty on hand: ......17
                              [▼]
[Update Qty][Print Barcode][Back]
```

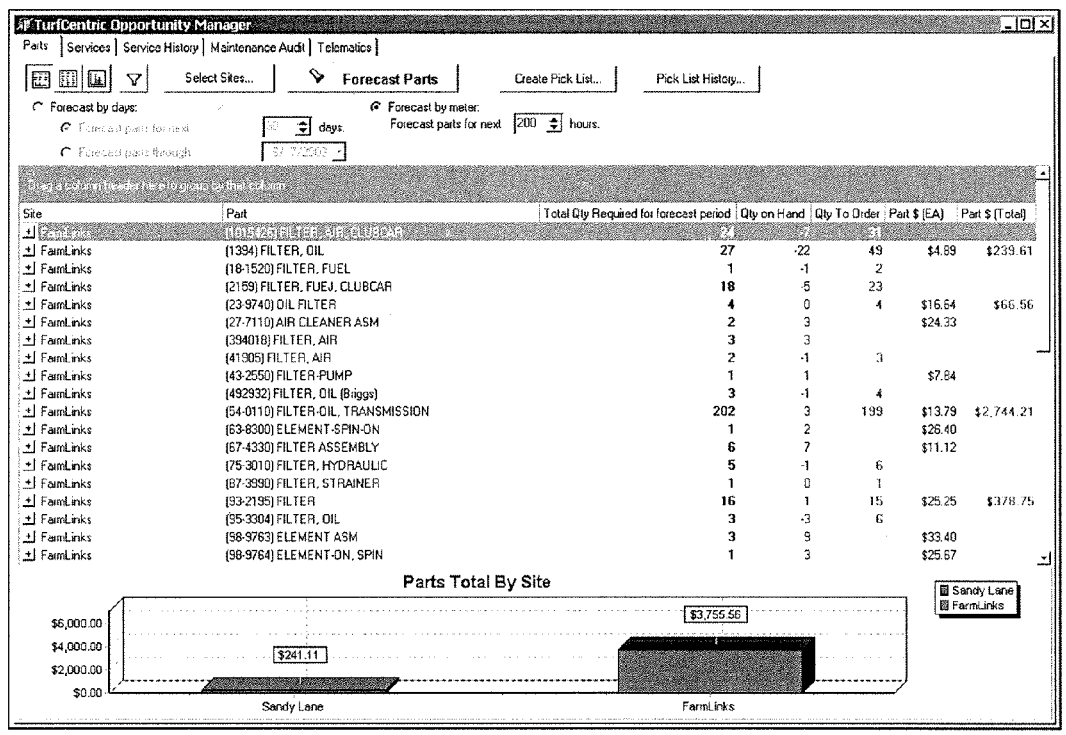
Figure 13: Parts Forecast Results, Grid and Graph

Pick List #12

Sandy Lane

| Ship | Part | $ EA | Needed | Ship Qty |
|---|---|---|---|---|
| ☑ | (94-2621) FILTER ELEMENT | $59.80 | 1 | 1 |
| ☑ | (98-9764) ELEMENT-ON, SPIN | $25.67 | 1 | 1 |
| ☑ | (99-8358) KIT-ELEMENT, W/O-RING | $9.93 | 1 | 1 |
| ☑ | (99-8384) FILTER-OIL | $15.89 | 5 | 5 |
| ☑ | (MOBILDTE15M) Hydraulic Oil, MobilDTE15M | $4.99 | 13 | 13 |
| ☑ | (SAE30SH,SJ) Engine Oil, SAE30SH,SJ | $1.39 | 1 | 1 |
| ☐ | (93-2195) FILTER | $25.25 | 0 | 0 |
| ☐ | (93-9162) FILTER-PRIMARY | $51.98 | 0 | 0 |
| ☐ | (93-9163) FILTER-SECONDARY | $36.45 | 0 | 0 |
| ☐ | (SAE10W30CF,CF4) Engine Oil, SAE10W30CF,CF4 | $0.99 | 0 | 0 |
| ☐ | (SAE80W90) Gear Oil, SAE80W90 | $1.39 | 0 | 0 |

Select All    Unselect All    Invert Selection

Pick List Notes

✓ Update Client Parts Inventory    ✗ Cancel

Figure 14: Create Pick List Detail

| Pick List # | Date | Course | Notes | Applied |
|---|---|---|---|---|
| | 12/7/2003 | Sandy Lane | | |
| 11 | 7/3/2003 | Sandy Lane | | N |
| 10 | 7/3/2003 | Sandy Lane | | N |
| 9 | 7/3/2003 | Sandy Lane | | Y |
| 8 | 7/3/2003 | Sandy Lane | | N |
| 7 | 7/3/2003 | Sandy Lane | | Y |
| 6 | 7/3/2003 | Sandy Lane | | N |

| Parts | Ship Qty |
|---|---|
| (93-2195) FILTER | 2 |
| (94-2621) FILTER ELEMENT | 10 |
| (98-9764) ELEMENT-ON, SPIN | 1 |
| (99-8358) KIT-ELEMENT, W/O-RING | 1 |
| (99-8384) FILTER-OIL | 5 |
| (MOBILDTE15M) Hydraulic Oil, MobilDTE15M | 13 |
| (SAE30SH,SJ) Engine Oil, SAE30SH,SJ | 1 |

Notes

| Pick List # | Date | Course | Notes | Applied |
|---|---|---|---|---|
| 5 | 7/3/2003 | Sandy Lane | | N |
| 4 | 7/3/2003 | Sandy Lane | | N |

Close

Figure 15: Pick List History Detail

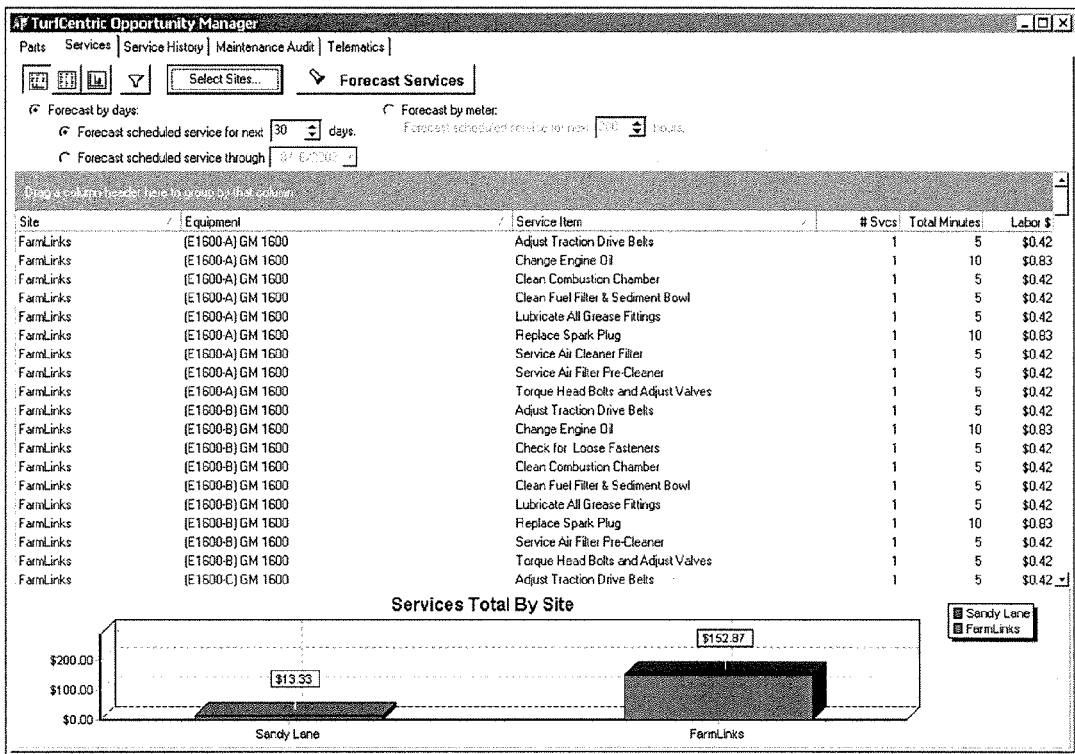
Figure 16: Services Forecast Results, Grid and Graph

Figure 17: Services Grid

Figure 18: Maintenance Audit Grid

| Model # | Model # Description | Rollup Size | AEP $$ | AEL Time (hrs) | AAP $$ | AAL Time (hrs) |
|---|---|---|---|---|---|---|
| ± 03201 | Reelmaster 3100D Sidewinder S2 (Tractor Hyd Fluid) | 1 | | 96.71 (Need SRTs) | 1423.7 | 2 |
| ± 03201 | Reelmaster 3100D Sidewinder S3 (Tractor Hyd Fluid) | 1 | | 95.71 (Need SRTs) | 1423.7 | 1 |
| – 03201 | Reelmaster 3100D w/ Sidewinder | 2 | | 9.945 (Need SRTs) | 1423.7 | |
| | Service | | AE Cycles | | AA Cycles | |
| | ± Adjust Engine Valves | | 0 | | 0 | |
| | ± Change Engine Oil | | 3.3 | | 0.8 | |
| | ± Change Engine Oil and Filter | | 1.5 | | 0.3 | |
| | ± Check Air Filter, Dust Cup, and Burp Valve | | 162 | | 0 | |
| | ± Check Battery Cable Connections | | 3.3 | | 0.8 | |
| | ± Check Battery Electrolyte Level | | 3.3 | | 0.8 | |
| | ± Check Brake Operation | | 162 | | 0 | |
| | ± Check Cooling System Fluid Level | | 162 | | 0.1 | |
| | ± Check Engine Oil Level | | 162 | | 0 | |
| | ± Check Engine RPM (Idle & Full Throttle) | | 0.1 | | 0.1 | |
| | ± Check Fan and Alternator Belt Tensions | | 3.3 | | 0.8 | |
| | ± Check for Fluid Leaks | | 162 | | 0.1 | |
| | ± Check Fuel Level | | 162 | | 0.1 | |
| | ± Check Height-of-Cut Adjustment | | 162 | | 0 | |
| | ± Check Hydraulic Hoses for Damage | | 162 | | 0.1 | |
| | ± Check Hydraulic System Oil Level | | 162 | | 0.1 | |
| | ± Check Instrument Operation | | 162 | | 0.1 | |
| | ± Check Radiator & Screen for Debris | | 162 | | 0.1 | |
| | ± Check Reel-to-Bedknife Adjustment | | 162 | | 0 | |
| | ± Check Safety Interlock Operation | | 162 | | 0 | |
| | ± Check Tire Pressure | | 162 | | 0.1 | |
| | ± Check Unusual Engine Noises | | 162 | | 0 | |
| | ± Check Unusual Operating Noises | | 162 | | 0 | |

Figure 19: Maintenance Audit, Service Detail

| TurfCentric Opportunity Manager | | | | | | | |
|---|---|---|---|---|---|---|---|
| Parts | Services | Service History | Maintenance Audit | Telematics | | | |

Select Sites...    Run Audit

- ⊙ Audit for the past [180] days.      ○ Audit between [7/ 7/2002] and [7/ 7/2003]
- ○ Audit since [7/ 7/2002]              ○ Audit ALL history

| Model # | Model # Description | Rollup Size | AEP $$ | AEL Time (hrs) | AAP $$ | AAL Time (hrs) |
|---|---|---|---|---|---|---|
| ± 03201 | Reelmaster 3100D Sidewinder S2 (Tractor Hyd Fluid) | | | 95.71 (Need SRTs) | 1423.7 | 2 |
| ± 03201 | Reelmaster 3100D Sidewinder S3 (Tractor Hyd Fluid) | 1 | | 95.71 (Need SRTs) | 1423.7 | 1 |
| − 03201 | Reelmaster 3100D w/ Sidewinder | 2 | | 9.945 (Need SRTs) | 1423.7 | |
| Service | | AE Cycles | | AA Cycles | | |
| ± Adjust Engine Valves | | | 0 | | 0 | |
| ± Change Engine Oil | | | 3.3 | | 0.8 | |
| − Change Engine Oil and Filter | | | 1.5 | | 0.3 | |
| Part(s) | | AE Qty | AE Part $$ | AA Qty | AA Part $$ | |
| (99-8384) FILTER-OIL | | 1.5 | $23.84 | 0.3 | $4.77 | |
| (SAE10W30CF,CF4) Engine Oil, SAE10W30CF,CF4 | | 1.5 | $1.50 | 0.3 | $0.30 | |
| Service | | AE Cycles | | AA Cycles | | |
| ± Check Air Filter, Dust Cup, and Burp Valve | | | 162 | | 0 | |
| ± Check Battery Cable Connections | | | 3.3 | | 0.8 | |
| ± Check Battery Electrolyte Level | | | 3.3 | | 0.8 | |
| ± Check Brake Operation | | | 162 | | 0 | |
| ± Check Cooling System Fluid Level | | | 162 | | 0.1 | |
| ± Check Engine Oil Level | | | 162 | | 0 | |
| ± Check Engine RPM (Idle & Full Throttle) | | | 0.1 | | 0.1 | |
| ± Check Fan and Alternator Belt Tensions | | | 3.3 | | 0.8 | |
| ± Check for Fluid Leaks | | | 162 | | 0.1 | |
| ± Check Fuel Level | | | 162 | | 0.1 | |
| ± Check Height-of-Cut Adjustment | | | 162 | | 0 | |
| ± Check Hydraulic Hoses for Damage | | | 162 | | 0.1 | |
| ± Check Hydraulic System Oil Level | | | 162 | | 0.1 | |
| ± Check Instrument Operation | | | 162 | | 0.1 | |
| ± Check Radiator & Screen for Debris | | | 162 | | 0.1 | |
| ± Check Reel-to-Bedknife Adjustment | | | 162 | | 0 | |

Figure 20: Maintenance Audit, Parts Detail

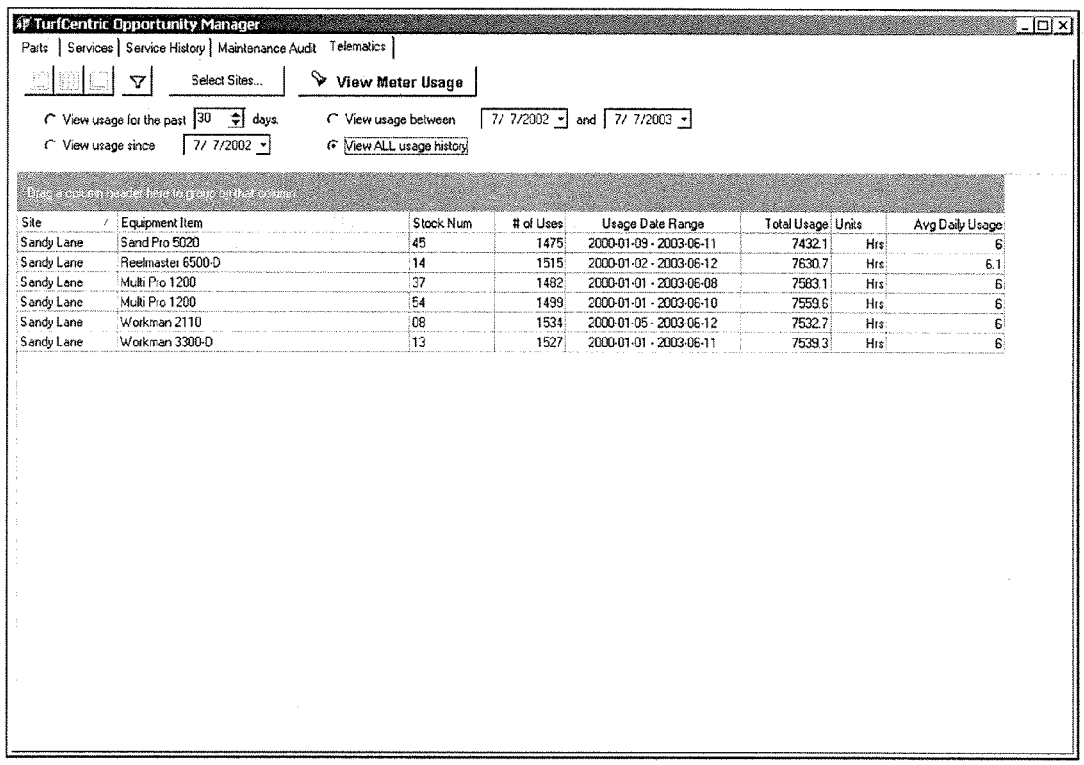
Figure 21: Telematics Results

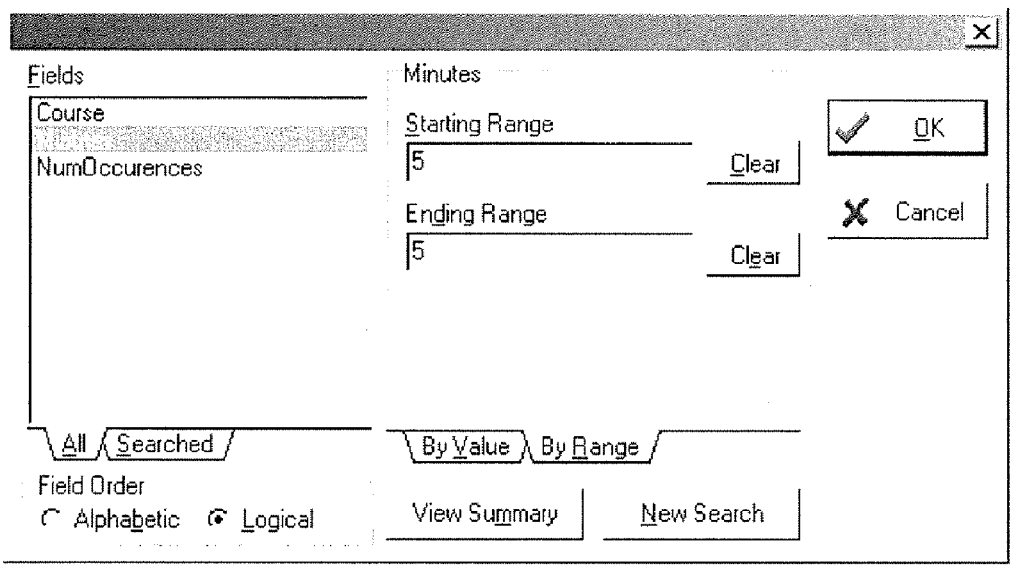
Figure 22: Filter Detail

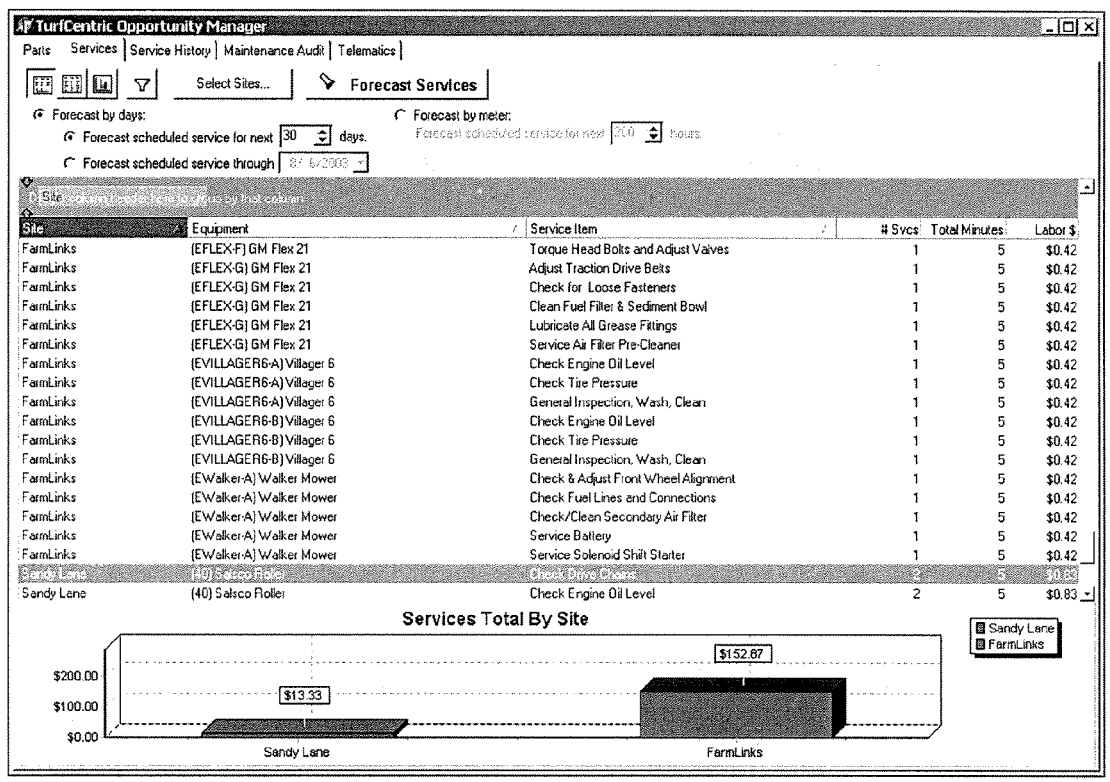
Figure 23. Grouping Results

INTEGRATED SYSTEM FOR ROUTINE MAINTENANCE OF MECHANIZED EQUIPMENT

PRIORITY CLAIM

This application claims priority to U.S. Provisional Application 60/427,289, titled Event Driven Equipment Service System, and filed on Nov. 18, 2002. That application is hereby incorporated by reference in its entirety.

APPENDIX

Appendix 1 is a computer program listing of two compact disks each having a copy of the host system source code for operating the functions described of the host system described herein for non-GCS station field input device communications with the database. It does not include filed input device code, response station code, GCS station code, or opportunity manager code. The contents of these disks are incorporated by reference. The file folders contained on the disk are as follows:

| Name | Size | Date Created |
| --- | --- | --- |
| PalmServer.txt | 244 | 11/13/2003 |
| PalmServerConsts.txt | 1,807 | 11/13/2003 |
| PalmServerParamConsts.txt | 5,118 | 11/13/2003 |
| PalmServerVDMConsts.txt | 147 | 11/13/2003 |
| TSMsgs.txt | 968 | 11/13/2003 |
| Unit1.txt | 120,570 | 11/13/2003 |

FIELD OF INVENTION

This invention relates to a system for monitoring fleet mechanized equipment, such as turf, agriculture, construction and recreation equipment, to determine when preventative maintenance is required. More particularly, the system includes transponders positioned on each vehicle that send operating characteristics to a central processor that alerts users of required maintenance when the monitored characteristics meet or exceed trigger thresholds.

BACKGROUND OF THE INVENTION

Mechanized equipment used in outdoor applications such as golf courses, agriculture, construction, commercial landscaping and recreation environments, such as municipal parks, is specialized and in many cases unique depending on the intended field of use. Tractors, reel mowers and rotary mowers (collectively "mowers"), aerators, utility vehicles (a modified golf cart), combines, mechanized construction equipment such as bulldozers and backhoes, are some of the specialized equipment used in outdoor applications (as used herein, "mechanized outdoor application vehicles" does not include automobiles, trucks and the like). Manufacturers for such equipment usually customize their products to accommodate a specific use, with each item of equipment having its own unique service and preventative maintenance requirements. Mechanized outdoor application vehicles are subject to harsh operating conditions and these operating conditions contribute to their need for specialization and customization. For example, mechanized outdoor application vehicles are routinely subjected to environmental variables such as extreme heat and cold, moisture, chemicals and solvents, various foreign matter (e.g., dirt, mud, grass and other vegetation, a variety of crops, rock and gravel, etc.), extreme vibration, and rough terrain. These variables require that virtually all components of a mechanized outdoor application vehicle be "ruggedized" for durability in order to withstand such operating conditions and variables. For this reason, mechanized outdoor application vehicles do not usually include microcontrollers and microprocessors to diagnose parameters that trigger scheduled maintenance requirements such as those found in most present day automobiles. Mechanized outdoor application vehicles used in commercial outdoor applications are considered mission critical. Therefore, when such mechanized equipment encounters unscheduled downtime, this directly and negatively affects the commercial outdoor application. A primary cause of equipment failure leading to unscheduled downtime is the delay or omission of scheduled maintenance. Relevant and timely equipment maintenance helps prevent unscheduled downtime. However, since mechanized outdoor application vehicles do not provide for an integrated system to alert of currently required scheduled maintenance requirements and related required resources, this equipment is virtually never serviced with scheduled maintenance and related required resources at the actual time due. Therefore, equipment is normally serviced either prematurely or belatedly. Many scheduled maintenance requirements for mechanized equipment used in outdoor applications requires various resources such as replacement parts and supplies to complete the scheduled maintenance requirements. In the event such resources (inventory, parts, supplies) are not on-hand when they are needed to complete scheduled maintenance requirements, the required scheduled maintenance is either delayed or the equipment item requiring replacement parts not currently on-hand remains idle until said replacement parts are ordered and received, which results in unscheduled downtime.

Mechanized outdoor application vehicles are normally maintained and repaired onsite. Most on-site maintenance and repair service operations for outdoor applications lack the level of monitoring, scheduling, referencing and record-keeping capabilities found in automotive and other commercial maintenance and repair operations. Further, many on-site maintenance and repair personnel for outdoor applications lack the level of technical expertise found in automotive and other commercial maintenance and repair operations. To assist maintenance personnel, manufacturers of mechanized equipment for use in outdoor applications specify and publish scheduled maintenance requirements and required OEM (Original Equipment Manufacturer) resources such as parts for each equipment item they manufacture. Although certain manufactured equipment items share common scheduled maintenance requirements and/or resources, manufacturers generally specify and publish scheduled maintenance requirements and required resources for each and every item they manufacture, based upon model, and potentially, the year of manufacture. Consequently, there exist a vast array of published scheduled maintenance requirements and required resources for all makes and models of mechanized equipment for use in outdoor applications.

Manufacturers of mechanized outdoor application vehicles primarily sell their products to end use customers via an established network of value added distributors. These value added distributors normally provide end use customers with product sales, product service and product support (as an example product support includes warranty related service and support). The level of product sales, service, and support such distributors provide their customers could be enhanced if they had better access to relevant and updated customer and customer product data (e.g., operational data regarding typical usage and current status of customer products).

Additionally, there exists a variety of non-OEM services, inventory, supplies, and parts provided by organizations that target the customers of manufacturers and value added distributors for mechanized equipment used in outdoor applications that directly compete with the OEM services. Therefore, any system that could be used by manufacturers and distributors to enhance the level of service provided to their customers would be helpful to better compete against organizations attempting to sell non-OEM services, inventory, supplies, and parts to said customers.

OBJECTS OF THE INVENTION

It is an object of the invention to provide a system that alerts on-site personnel of their scheduled maintenance requirements and resource requirements for mechanized equipment in a simple, user-friendly format.

It is an object of the inventions to provide a system that provides easy access to maintenance personnel of necessary scheduled maintenance, related required resources, and other support information from a single centralized source.

It is an object of the invention to provide a system that enables manufacturers of mechanized equipment to regularly interact with their established network of value added distributors (OEM Supply Chain) to share in product and service information (e.g., product improvements, enhancements, problems, defects, warnings, price changes, training programs, etc.), market information (competitor products, features, pricing, etc.), and customer/market information (new customer/market opportunities, customer/market trends, product usage patterns).

It is an object of the system to provide a centralized fleet maintenance and customer relationship management system for those associated with mechanized equipment used in outdoor activities.

It is an object of the system to provide maintenance history data and inventory data to authorized users of the system to forecast, predict, compare and model equipment maintenance and related resource requirements.

It is an object of the system to help end use customers efficiently maintain their mechanized equipment used in outdoor applications and to minimize unscheduled downtime and to allow the OEM Supply Chain for such mechanized equipment and related resources (inventory, parts, supply, labor) to optimize their service level to the customer.

SUMMARY OF THE INVENTION

The system is directed to remotely monitoring the need for routine scheduled preventative maintenance for a fleet or fleets of mechanized equipment located at a variety of physical locations. As used herein, a "fleet" of vehicles implies a group of vehicles operated by a common entity. The system monitors periodic transmissions from each monitored vehicle, comparing transmitted data values against stored recommended service intervals. Upon detecting the need for maintenance on a particular piece of equipment, the system provides a means to schedule the maintenance, including details of recommended parts and labor recommended for the maintenance. The system is a task integrated system for providing scheduled service: the system monitors the equipment fleet to collect operating parameters (e.g. meter readings or odometer readings) to detect service triggers, provides designated multiple users an alert that a particular item of equipment requires service, provides a means to initiate and track the service transaction (open a service work order, update the work order, and close the work order) and to archive the service transaction information for later use. To assist in the maintenance service process, the system includes an inventory subsystem which monitors inventory utilization, assigns inventory to open work orders, and projects inventory replenishment needs.

Transponders or field data input terminals are generally used to wirelessly transmit relevant equipment performance and operating data to a network access point for transmission to a system program for analysis. Generally, the relevant performance and operating data will be a meter reading (engine hours), odometer reading (mileage), or time lapse, but other performance data can be utilized. The system program performs the monitoring, analyzing, alerting, initializing and tracking features, and the system program communicates relevant maintenance information with user terminals accessible to maintenance/management personal as required. The terminals may be located at a central facility or facilities remote from the system program host, and/or broadcast to a series of mobile user terminals.

Associated with the monitoring program is a database containing vehicle histories, vehicle manufacturer's maintenance data (maintenance schedules, recommended replacement parts, recommended labor times, service manuals, etc), inventory data, and other relevant information. The stored data is made available to interested parties to assist in maintenance tasks, track/compare parts usage data, compile product/maintenance/part/labor statistics, product comparisons, area usage requirements, and other relevant data analysis. Data analysis routines are provided to allow prediction/forecasting of future maintenance requirements, inventory needs and/or labor requirements. Additional data analysis routines are used to mine relevant information from the stored equipment information, such as a routine to assist in identifying equipment subject to a manufacturer's recall or rework order, and once identified, undertaking this non-routine maintenance item.

BRIEF DESCRIPTION OF THE FIGURES

FIGS. 2-23 depict screen shots taken from the system as described.

FIG. 2 Smartstation screen: PM Alert for selected equipment E5500-B Reelmaster.

FIG. 3 Smartstation screen: View In Progress: Details of Work Order number 1145 (Work Order Detail).

FIG. 4 Smartstation screen: View In Progress: View Services: Add Repair.

FIG. 5 Smartstation screen: View In Progress: View Parts.

FIG. 6 Smartstation screen: View In Progress: View Labor: Add Labor.

FIG. 7 Smartstation screen: pick list of maintenance equipment.

FIG. 8 Palm Screen: Required Maintenance: View Service.

FIG. 9 Palm Screen: Equipment Work Orders: All Open (Fleet).

FIG. 10 Palm Screen: Inventory: Main.

FIG. 11 Palm Screen: Inventory: Create Item.

FIG. 12 Palm Screen: Inventory: Details (Scan Item.

FIG. 13 Palm Screen: Parts Forecast Results, Grid and Graph.

FIGS. 14-23 are screen shots from the Opportunity manager, generally displayed at a GCS station (desktop computer).

FIG. 14 Opportunity Manager Screen: Create Pick List Detail.

FIG. 15 Opportunity Manager Screen: Pick List History Detail.

FIG. 16 Opportunity Manager Screen: Services Forecast Results, Grid and Graph.

FIG. 17 Opportunity Manager Screen: Services Grid.

FIG. 18 Opportunity Manager Screen: Maintenance Audit Grid.

FIG. 19 Opportunity Manager Screen: Maintenance Audit, Service Detail.

FIG. 20 Opportunity Manager Screen: Maintenance Audit, Parts Detail.

FIG. 21 Opportunity Manager Screen: Telematics Results.

FIG. 22 Opportunity Manager Screen: Filter Detail.

FIG. 23 Opportunity Manager Screen: Grouping Results.

DETAILED DESCRIPTION OF THE INVENTION

Figure 1:
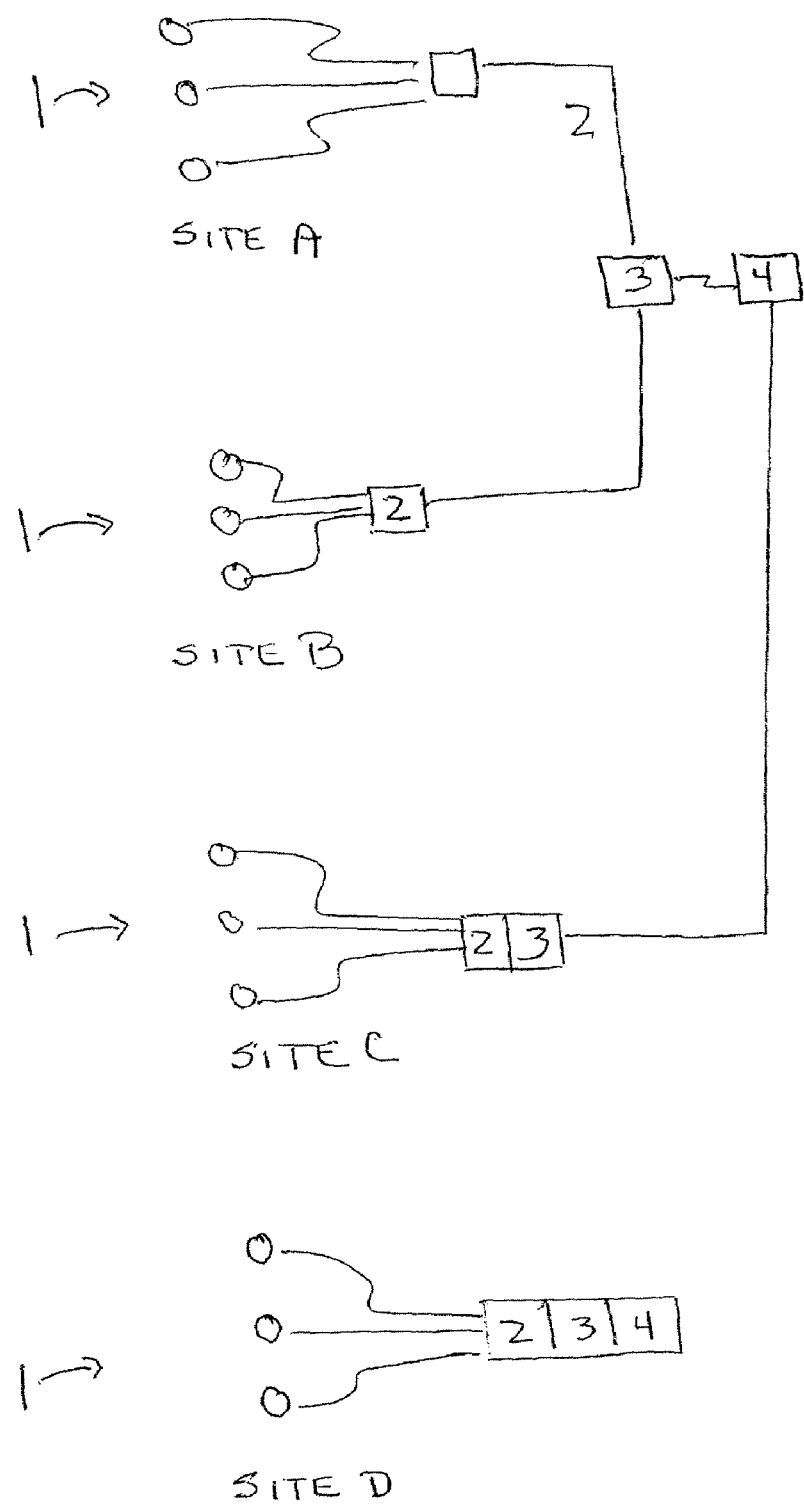
FIG. 1 is a schematic depicting alternative network configurations of the system.

The system has four aspects: host computer system and software; the transponders and/or other field input stations; the response or other user terminals; and the connecting network (Internet or intranet). The system will be described in an application environment of maintenance of golf course mechanized equipment. As used herein, "vehicle" or "mechanized equipment" is a powered machine (internally powered or externally powered, such as power provided by the PTO of a tractor) which has routine preventative maintenance requirements specified by the manufacturer or another based upon some measure of machine utilization, such as hours of use, mileage accrued, the passage of time, or some other measure reflection use. The system can be physically configured to accommodate a variety of installations. Several configurations are shown in FIG. 1, which shows four physically separated golf course sites A, B, C, and D with each site having a number of vehicles to be monitored for routine maintenance requirements. Each sites monitored vehicles/equipment can be considered a "fleet" of vehicles/equipment, or all the sites' monitored vehicles/equipment can be considered a fleet of vehicles/equipment. At each site are a series of transponders 1 communicating through a network 2 to a host computer facility where the monitoring program is stored. As shown, sites A and B communicate to a shared program site remote from either site. Site C and site D communicate through a network to a host program located at the respective sites. Communication to the host site can be through an intranet or the Internet. Also shown is a database 4. The database can be located at the host facility (as shown at site D), located at a second remote data facility accessible through a network (as shown in C), or a combination thereof as required. The database can be a series of unshared databases (for instance, site A has a database separate from Site B) or a single or multitude of shared database (for instance, data from sites A and B can be commingled in one database). The database may have its own processor or shared host processor. The system is flexible enough to be adapted to a variety of configurations.

Golf Courses

Each golf course uses a wide variety of equipment to maintain the course, generally supplied by three vehicle manufacturers. A single golf course will use a variety of mowers, utility vehicles, tractors, tillers and other mechanized equipment. To maintain this equipment, each golf course usually operates repair facilities, stocks inventory and utilizes maintenance personal either on site or on call. Several geographically close courses may share portions of their respective maintenance facilities, such as inventory or specialized labor. For instance, when several city courses have common ownership, it may be economically feasible to share a common maintenance facility.

Each item of mechanized equipment requires routine scheduled maintenance. It is generally recognized that equipment lasts longer and performs better when routine scheduled maintenance is performed (routine scheduled maintenance or preventative maintenance is maintenance that is common for each model of a vehicle and the need for maintenance is generally based upon vehicle utilization parameters); however, even with only three predominant manufacturers of golf course equipment, maintenance personnel have great difficulty keeping track of when maintenance is needed, on which machines, and what services are to be performed. Consequently, a system that helps automate the tasks of identification of equipment currently recommended for preventive maintenance and identification of the actual services recommended for that preventative maintenance trigger would help ensure that routine preventative maintenance is accurately and timely undertaken.

The System

A. The Host System and Software

The host system, referred to as the "GCS System", is a computer/server located within at least one location and running the GCS software. The host system includes at least one database, but the database can be stored remotely from GCS main program. The system can be distributed over a series of locations. For example, each individual golf course can have a computer with monitoring software and the associated database or the monitoring software and/or database could be shared among several courses on a single server. In the single server environment, each course may be associated with its database structure, or a database structure could be shared (with a database entry identifying the golf course ID). In an Internet configuration, multiple golf courses could access the system (software and/or databases) through a common web page or IP address/portal, again with separate databases or an integrated database. The GCS system software, as seen by a user, is a menu driven application and the following description will describe the system from the menus presented to a user.

B. System Databases

The system database can be a single integrated database, or a series of databases. For convenience, the databases will be referred to as a "golf course" or "course" database. A relational SQL-type database is preferred. The database can be envisioned as having five general areas: the equipment definition area, the equipment history area, the inventory area, the manufacturer's area, and the employee area. The equipment definition area stores maintenance parameters for the monitored vehicles/equipment. Each vehicle/equipment item for which system maintenance monitoring is desired must have its relevant characteristics stored in the course database. The relevant characteristics include: one or more vehicle identifiers, manufacturer/model information of the vehicle, and one or more maintenance triggers. "Vehicle identifier" can be a vehicle serial number, a bar-coded ID, a unique IP address, a VDM identifier, date in service, or other identifier or combination of such identifiers. The manufacturer/model information can include manufacturer, model number, model year, distributor and/or other pertinent characteristics. Each vehicle's maintenance trigger field is a data field used by the monitoring program to make decisions on initiating service for that particular vehicle. As used in this application, a maintenance trigger is data that standing alone, does not indicate that maintenance is required, such as an alarm would indicate (e.g. equipment reading out of range). "Maintenance trigger" is used to indicate that the monitoring program must compare the received data against stored schedules to determine if maintenance is required or recommended. The maintenance trigger can be measured in operational hours, vehicle mileage, time, date (time lapse), etc. The maintenance trigger field can be structured in a variety of fashions, later described. In general, the maintenance trigger references machine use or utilization and the stored database value is updated periodically. In the present embodiment, each update (value/date and time of update) is stored in the database. Also stored are the maintenance alert values or intervals (in general, the OEM's recommended maintenance periods, such as 30 hour interval, or 1000 mile interval, absolute engine hours or odometer readings (i.e. at 10,000 hours etc) as modified by the user). The maintenance alert values are generally stored in the database in the manufacturer's area, as these values are common for each manufacturer's models, but for ease of operation, can be included in the equipment definition area. These maintenance alert values are considered "maintenance interval values" and may be measured as an interval value (every 100 miles, every 10 hours, etc) but may also be measured as an absolute value from a base line (e.g. at 500 hours, at 600 hours, at 100 miles, at 2000 miles, etc).

The equipment history area is that area of the database where work orders are stored that detail the service history (preventative maintenance and/or unscheduled repairs) of the particular equipment item. Items stored include work order number, date of performance (open date, closed date), vehicle ID to identify the equipment, maintenance trigger at time of maintenance, services performed, parts utilized, recommended labor hours, actual labor hours, and other information contained on the work order, as later described.

In the inventory area of the database is stored parts information, such as customer part/stock number, description, UPC number or barcode, vendor (name, address), vendor part number, price, quantity on hand, quantity allocated to open work orders, quantity ordered, reorder point, last used date, last used quantity, quantity used year to date, and other relevant information. Also purchase information can be maintained (either considered as a separate area of the database, or considered as part of the inventory area). Purchase information would include PO numbers, purchase date, items ordered, vendor/supplier, price and other purchase order information.

In the employees area of the database is maintenance employee information, such as employee name and hourly pay rates. Other data fields can be utilized to track personnel, such as vacation days, sick days, address, emergency contact numbers, etc.

To assist in initial population of the database for a particular golf course implementation, the system includes a routine, called the "Quickload" routine, that enables a user to quickly populate the database equipment area and manufacturer area. The Quickload routine includes a database of OEM information, including maintenance schedules, replacement parts, model specific repair and user manuals, etc. Quickload, upon implementation requests the user to identify the equipment manufacturer, and once selected, Quickload displays the models available for the selected manufacturer. The user then selects the model equipment desired from the displayed list, and then enters the relevant information for the selected models that is entered as an entry in the system database. For instance, the golf course may have several Toro model 0110 aerators. The user would select Toro, then select model 0110 aerator and enter the relevant data for a particular aerator (vehicle ids, serial numbers, etc) to create an entry in the equipment portion of the system database. Quickload then allows the user to make another selection (for example, the user could select the same model again to create a second Toro 0110 aerator). Alternatively, the user could select the model and the number of that model to enter into the course database then enter the relevant vehicle specific data for the number selected. The QuickLoad routine can also be used to add equipment to an existing course database, and is accessible to users on a GCS station (described later) having suitable password access. Once a vehicle is entered in the database, the later history of that vehicle (monitored values and maintenance history) will be stored in the database and associated with the particular vehicle for ease of searching and retrieval.

Other aspects of the database must also be initialized and populated, such as inventory levels and labor availability/specifications, again using the GCS station. The user does not have to enter the maintenance schedule intervals for the selected equipment, nor the recommended parts or labor hours for a particular scheduled maintenance. Each manufacturer typically provides these maintenance requirements for its equipment and these recommended scheduled maintenance requirements are preloaded (or accessible) by the system in the manufacturer's area. In particular, when Quickload is utilized, the manufacturer's information for each vehicle entered is also loaded into the course database manufacturer's area (such as vehicle specific maintenance schedules indicating recommended maintenance intervals for scheduled maintenance, each scheduled maintenance having associated maintenance tasks; here, "vehicle specific" generally refers to the vehicle model as all same model vehicles have the same maintenance schedules). The system thus stores in the course database (or may access over the network) the manufacturers recommended maintenance schedules, including the manufacturer's recommended parts and labor requirements for each scheduled maintenance.

Obviously, if several courses share the same database, the database must also contain at least one course ID.

C. Field Input Devices

In operation, the system tracks field equipment to determine if routine scheduled maintenance is required. The system receives updated vehicle maintenance trigger data through field input devices, (e.g. updated meter readings or odometer readings). The field input devices are considered a means to transmit vehicle maintenance trigger data to the remote host system. Upon receiving updated maintenance trigger data, the host system compares the maintenance triggers updated value against the store maintenance alert data (the vehicle's recommended maintenance schedule, usually the OEM recommendation unless user modified). If the current value exceeds the maintenance alert values, the system will trigger an alert to notify maintenance users that preventative maintenance is recommended. Hence, the equipment to be monitored must have some means of providing the relevant monitored characteristics to the system, the field input devices, which can include transponders, mobile user stations or fixed user input devices. The host computer, in performing this task, is considered a means to determine maintenance requirements of a vehicle based upon the transmitted or otherwise updated maintenance trigger data.

i. VDM

The vehicle transponder is referred to as a vehicle data module ("VDM") and it interfaces with suitable equipment on the vehicle to collect and transmit to the host system the appropriate monitored maintenance trigger data. VDMs are physically mounted on a vehicle's frame/chassis in a rugged, waterproof case that provides wiring connections for power, ground, and the various operational signals to be monitored. The preferred embodiment of the VDM consists of electronic components and a vehicle mounted antenna. The electronic components include a microcontroller, an 802.11b wireless Ethernet card (if wireless communication is utilized to communicate to an access point), and various signal conditioning circuitry for monitoring vehicle operations. One microcontroller used is a MicroChip PIC18F452 containing 1536 bytes of RAM, 256 bytes of EEPROM data memory, and 32K bytes of program Flash EPROM which houses the software code to run the device. The PC board provides connections for +12V DC power, ground, and vehicle signals. There is also a DB9 female connector for RS232 serial communications for system configuration/setup.

The VDM is powered from a +12V DC power source on the vehicle as well as a ground connection. The VDM can be configured in several different monitoring modes depending on vehicle type, such as:

Hour Meter—the microprocessor monitors a +12V DC engine run signal from the vehicle (usually available as a lead to the mechanical hour meter). The VDM monitors this signal, keeping track of how much time elapses while it is active (as clocked by the controller's clock or external timing device).

Odometer—the VDM monitors either a differential or single-ended ac-coupled odometer waveform from +/−0.5 V to +12 V. This signal is usually available from a Vehicle Speed Sensor (VSS) output from the vehicles transmission, but can also be obtained from a variety of other places depending on the specifics of the vehicle.

Odometer w/OBDII—the VDM monitors the odometer as in item 2, but additionally can monitor an On-Board Diagnostics II (OBD-II) system. The OBDII uses a serial interface to communicate with the vehicle's OBDII computer using any one of the three standard protocols: J1850 PWM (Ford), J1850 VPW (GM/Chrysler), or ISO9141 (others). Each vehicle containing an OBD II computer will have a standard J1962 connector that can be plugged in to the transponder electronics.

Additionally, other signals could be monitored (which may necessitate installing monitoring devices) as a maintenance trigger, such as a signal indicating that the mowing blades are engaged, or a signal indicating the status of other pertinent characteristics.

In operation, the VDM stores the pertinent identification data and collects and stores the operational data (e.g. maintenance trigger data) for later transmission to the host system. The VDM (and other field input devices), will periodically transmit data to a receiver for ultimate reception by the host. By "periodically" is not meant as transmission at regular intervals, but is used as from time to time. Operational data will generally be the monitored quantity, such as meter readings. Identification can include the IP address/port number assigned to the VDM, IP address/port number assigned to the recipient GCS host computer or web site for communication, vehicle serial number, VDM serial number, or any combination. The VDM will generally store operational data as a running sum from an initial point, where the initial point can be reset by the VDM or on instruction from the host system. Re-initialization can be based upon a prior data transmission, prior service point, or other chosen event. For instance, vehicle meter reading may be stored as a value as measured from the last data transmission. Upon shut down of the vehicle, the VDM may try to communicate its stored values to the host system. If communication is successful and the reading is successfully transmitted, the stored meter reading could be reset or re-initialized. If transmission is unsuccessful, the stored value is unchanged and upon vehicle startup, new "minutes" are added to the stored value. Other schemes could be used to save and transmit maintenance trigger or other operational data. For instance, simply transmitting current value with no-resetting is an alternative method, letting the GCS system compute differential values, if needed.

These parameters are accessible for initialization/setup purposes through a RS232 serial interface. In operation, the VDM monitors the pertinent vehicle characteristic (hour meter/odometer/OBDII or other value) and updates its internal values. When the vehicle is within communication range of the access point, the VDM can communicate its monitored values through the access point to the GCS host server. The VDM can be configured to transmit based on the presence of an updated or modified status since last transmission, the crossing of a stored threshold value (for instance, 10 engine hours since last transmission), a query from the GCS system, or other programmed event.

The VDM sends a UDP packet to the GCS host at the stored host IP address/Port. The packet generally consists of the vehicle ID and relevant operational data (meter/odometer, etc.). The VDM can be configured to transmit additional data, such as type of operational data (i.e., meter, odometer, OBDII, etc.) course identifier, or other relevant information. Upon successful receipt, the host server returns an acknowledgment to the VDM. If no acknowledgement is received, the VDM will periodically try to resend the data until it receives an acknowledgement. As described, the communication between the VDM and the GCS host software is generally two-way. Data could be sent to the VDM for purposes of remote re-programming, to activate added or dormant features.

Additionally, the VDM can function to interface to a maintenance indicator positioned on the vehicle/equipment item. The host system can send a signal to the VDM to activate/deactivate a maintenance indicator positioned on the VDM or equipment the VDM is mounted onto. The signal should be sent when the host system determines that maintenance is indicated/working/complete or other suitable status. Such a maintenance indicator should be a visual signal to maintenance workers in the field that this particular piece of equipment is recommended for maintenance (locate items requiring maintenance) to notify the maintenance workers to inquire further details. The maintenance indicator could be a lamp, LED indicator, a liquid crystal indicator, or other low power consumption device that can provide a visible signal to maintenance staff.

Another embodiment of the VDM includes a vehicle mounted device available from National Business Control Systems, Inc. (a/k/a eFueling Technologies). The eFueling VDM stores the vehicle ID and collects additional information such as odometer and engine hours, having inputs for power, ground, engine run, and odometer+/−, and uses a low frequency, close proximity passive antenna configuration that emulates Texas Instruments TI-RFid Systems radio frequency tag to exchanged stored data when the VDM antenna connected passes over an antenna buried in the ground, generally located in the doorway of the maintenance facility. The buried antenna is connected to a "reader" device that has an Ethernet interface to pass the data through a network to the GCS host system. The VDM was configured to provide a destination IP address/Port number for the reader to send VDM data to the GCS system. The reader has inputs for up to 8 antennas that are typically buried in the ground at high-traffic points, such as storage shed bay door entrances, etc. The reader repeatedly polls each of the 8 antennas to see if a VDM antenna was currently within communicating range. If so, the two antennas established a communication link and data was transferred between the VDM and reader. The reader includes an IP address and network interface card that interfaces the wired Ethernet network. Stored in the reader is the IP address/port of the host system to enable communications with the host. In this embodiment, the reader is the boundary of the network as communication to the VDM is through the reader over the close-proximity antenna. In the prior embodiment, the VDM was the boundary of the network, i.e. the host directly addresses each VDM through its IP network interface card/software/drivers/etc. by way of an access point.

ii. Mobile Field Station

Another means of communication of vehicle characteristics includes a mobile field station. A preferred station is a mobile computing station, utilizing a wireless configured personal digital assistant ("PDA", such as a Symbol Technologies 1746/1846 PDA), a tablet PC, or other intelligent mobile device. The mobile field station wirelessly communicates with the GCS host through an 802.11b telemetry or other wireless format. The mobile user station runs a local program to facilitate interaction with the GCS program. The following description will describe the functions of a PDA as the mobile user station using a menu description.

Currently, the PDA main menu consists of four (4) options displayed as touch buttons on the PDA's LED display. These options include the "Inventory" button, "Update Meter" button, "Required Maintenance" (Req Maint) button, and the "Equipment Work Order (Eq WO)" button. For purposes of communicating the vehicle characteristics, only the "Update Meter" is relevant. Other features of the PDA will be later described in the "Response Station" section.

The "update meter" option allows a user to identify the vehicle by: (a) scanning a bar code located on the vehicle or (b) by inputting the vehicle ID into the PDA. Preferably, the PDA has an integrated bar code scanner that is used to scan a bar code located on the vehicle. The scan/input Vehicle ID is transmitted to the host system, where (if recognized), pertinent vehicle characteristics and operational data are transmitted to the PDA for display. The user can then update the stored meter/odometer with its current reading. As currently implemented, the user is provided with UP/DOWN arrows with which to increment/decrement the stored operational data (for convenience, we will use "meter readings", such as engine hours or minutes). Upon receipt/storage of the updated reading, the system may detect a maintenance alert and may alert the user through the PDA. If, however, no match is found for the entered vehicle ID, the system notifies the user that the item was not found.

If for any reason an update fails, the device will display a message informing the user of this as well as giving the reason, and, depending on the nature of the error, either remain on the current screen to allow the user to re-enter the meter reading or return to the initial Update Meter screen, ready for the next equipment item scan. If the update was successful, the application will return to the initial screen ready to scan another item, but also inform the user of the successful meter update from the previous item scanned.

iii. Wired Field Station

Obviously, instead of a mobile wireless filed station, a wired device could be utilized, such as a desktop workstation, generally located in the maintenance area. A wired device may access the same features as mobile user station. Alternatively, a wired or wireless PC may access the host system through a network (intranet or Internet), log into the host system through an appropriate user ID (having access to the ability to update meter readings), and access the update readings feature of the GCS.

Finally, an alternative response station could be a telephone, whereby the user dials into an account on the host system, and keys in the vehicle ID and update maintenance trigger data.

D. Response Stations

A response station is a station receiving and communicating maintenance information (maintenance alerts, schedules or other information) with the host system. Response stations are considered as a means to alert maintenance personnel of vehicles requiring maintenance. The host system, upon receipt of updated maintenance trigger data, may determine that the vehicle just interrogated requires maintenance. In this instance, the host system must alert suitable response stations of the maintenance alert, and provide users the ability to manage the particular alert. Two types of devices are preferred as response stations: a touch screen station; and user response stations (such as the PDA device described earlier).

I. Touch Station

The touch screen station contains a touch screen, network connectivity, and may include a local computer station to manage the touch screen communications. The Touch Station is typically installed in high traffic maintenance shop areas and serves as an electronic bulletin board alerting shop employees of equipment for which scheduled maintenance service is due. The Touch Station is used to alert shop employees of equipment that is due for scheduled maintenance service and to allow shop employees to open and close work orders indicating that maintenance or a repair has been performed for certain equipment. Shop employees can also use the touch station to update existing maintenance work orders by indicating the services performed, the parts used, and the labor time expended. The two basic modes viewable from the Touch Station are "View PM Alerts" and "View In Progress". The touch screen is referred to as the SmartShop Touch Station.

1. View PM Alerts

The system compares the monitored vehicle characteristic of the equipment to the vehicle manufacturer's recommended maintenance schedule (the following will use "meter" readings as the relevant characteristic). If the current meter reading indicates that maintenance is due the system will send a vehicle maintenance alert to the appropriate touch station for display (the system may be managing several touch stations when managing multiple golf courses). The equipment requiring scheduled maintenance appears on the Touch Station under the "View PM Alerts" screen. This screen simply lists the equipment requiring maintenance by suitable reference, such as vehicle model and vehicle ID. These equipment items will continue to appear on this screen until the service requirements are either scheduled for work or delayed until later ("Snoozed"). If the equipment list is too long to fit on one page, the user can touch the up and down arrows located on the screen to scroll through the items.

The screen automatically refreshes periodically to display any new alerts that are generated. The refresh rate is user defined but is typically set to 60 seconds. However, the user may request an immediate refresh at any time by touching the "Refresh" button.

Each equipment item on the View PM Screen can be "touched" by the user to access the system information concerning that particular piece of equipment and its scheduled maintenance alert. The View PM screen may also have a touch area to view unscheduled service items, later described. To view the required maintenance for an alerted item of equipment, the user touches the equipment ID on the screen. Upon selection, the currently due maintenance requirements will be displayed. A representative screen shot is shown as FIG. 2.

Shown in FIG. 2 is the preventative schedule maintenance for the (E5500-B) Reelmaster 5500-D equipment. To the right of each service requirement is that service's "Next Maintenance Meter/Date". This field indicates the point at which the service requirement became due. This may be a meter reading, odometer reading or a date, depending on how the service interval is configured within the system. The check boxes on the left may be used to choose specific service requirements to be included when the Work Order is created, as later described.

This PM Alert Detail screen also includes some basic information at the top of the screen. In addition to the equipment's Stock Number and Description, displayed in red, the header also displays today's date and the current meter reading for this piece of equipment.

This screen includes (3) buttons that perform in the following ways:

Create WO: Touching this button will create a new preventative maintenance Work Order for the currently selected equipment item. This Work Order will include all of the currently due maintenance services that are selected, that is, that have checks in the boxes to the left of them. By default, all due maintenance items are selected, but the user may choose to unselect any of them. In addition to creating the Work Order, pressing this button prints a hard copy of the Work Order (if the system is configured to auto-print newly created work orders).

After printing, the screen reverts to the "View PM Alerts" screen. If the user chose to create a Work Order for all required services shown on the Details screen, then the equipment item will no longer appear on the "View PM Alerts" screen, as the equipment is now "scheduled" for maintenance on an open work order, and the maintenance for that equipment can be monitored on the "In Progress" screen from the touch station. However, if the user left some maintenance items unchecked when creating the work order, then the equipment item will continue to be displayed in red on the "View PM Alerts" screen alerting the user that there are still some required services that are due and not in progress.

Snooze: Touching this button allows the user to temporarily remove an equipment item from the "View PM Alerts" tab by delaying all of its currently required services until later, similar to how the snooze button on an alarm clock operates. Users can choose to delay services by incrementing hours, days, and/or mileage. Each maintenance item will reference the snooze value appropriate to its service interval. After setting the snooze criteria, touch the "Save" button to complete the snooze, or touch the "Back" button to return to the previous screen without snoozing the item.

Main: Touching this button will return the user to the "Viewing PM Alerts" tab.

2. View In Progress Screen

The View In Progress screen allows the user to view open equipment work orders. Any equipment items with service requirements that have been committed to an open Work Order are displayed on the "View In Progress" screen. This View In Progress screen simply lists the equipment by suitable vehicle ID for which a work order remains open, indicating that maintenance has been initiated or is "in progress." The user may touch any listed equipment item to access the details of that equipment's outstanding work orders for maintenance services, including the associated replacement parts and the labor times recommended to complete the work. If there are multiple open work orders for that piece of equipment, the user will be presented with a list of work orders from which to choose. If, however, there is only one open work order, the user is taken immediately into the work order detail screen, a representative screen shot of such is shown in FIG. 3.

The user can view additional details about the selected piece of equipment by touching the equipment stock number in the header field, shown as "(E5500-B) Reelmaster 5500-D" in FIG. 3. The displayed screen would show pertinent information such as the Make, Model, and Serial Number. From this detail screen, the user can access the manufacturers published Parts List and Service Manual by touching the "View Parts" and "View Manual" buttons.

The user performing the maintenance may update the data fields in the work order, such as labor time and labor rates, parts and services, etc (later described). Once the maintenance is completed, the user can close the work order. Closure removes the item from the "In Progress" list and resets the maintenance services to trigger again at the next regularly scheduled interval.

3. Work Order Screen

There are (3) main sections, or tabs, that comprise the Work Order detail:

(a). View Services Tab

The "View Services" tab is the default view, shown in FIG. 3. On this screen all of the In Progress maintenance service items for the selected piece of equipment are displayed. The Work Order number is displayed in the upper right hand corner.

Users can deselect any services not actually performed by simply touching the checkbox adjacent to the listed service. Deselected services are removed from the Work Order entirely once the work order is closed. If the service item removed was "due", then it will re-appear on the "View PM Alerts" screen, where it can be snoozed or rescheduled on a new work order.

There are (2) buttons that are specific to the "View Services" screen.

Add Scheduled Service: This button will display a list of all scheduled/recommended maintenance services associated with the currently displayed equipment item, even those that are not currently due. Touch the checkbox adjacent to a listed service to add it to the list of services performed (e.g. add it to the Work Order). Services that are already included on the Work Order are already checked and are colored red in this list. Deselecting a service here will remove it just as if you had deselected on the previous screen. Touching the "Done" button saves the selections and returns the user to the services tab. "Cancel" will return the user without changing the original list of scheduled services.

Add Repair: This button allows the users to include unscheduled repairs made to the selected equipment item in addition to the maintenance services already scheduled. Touching this button will display a special touch screen keypad allowing users to describe the type of repair performed (FIG. 7). Once the description has been entered, touch the "OK" button to save it. Clicking "Cancel" will return the user to the previous screen without changing the original list of scheduled services.

The touch screen keypad on the "Add Repair" screen can be toggled between the default alphabetical configuration and a standard keyboard "QWERTY" configuration. Simply double-tap in the blank area to the left or right of the keypad to switch.

Once a repair has been saved, it will appear in the "View Services" list as "Repair" and the details of this repair can be accessed by touching next to the "Repair" entry. To cancel the repair, deselect its check box.

(b). View Parts Tab

The "View Parts" tab allows the user to confirm, add, or delete parts used when servicing the selected equipment item (See representative screen shot, FIG. 5). As used herein, "part" includes equipment parts, such as an oil filter, and supplies, such as oil. Any parts associated with the services found on the "View Services" tab are automatically included. The user can deselect the check box to the left of each part to delete it (e.g. remove it from the work order).

Touch the "Add Parts" button to add the parts used during this service but not already included. The "Adding a Part" screen allows the user to specify the part used and indicate the quantity of that part. The user may access a search screen to allow the user to search for the appropriate part. Search fields include "Stock Number" or "Item Description." Search criteria are selected (e.g., "Starts with", "Exactly equals", or "Matches anywhere"), with the user inputting data through a touch screen keypad provided. A list of parts that matches the search is produced and the user may select one used for the maintenance. The user will then be returned to the "Adding a Part" screen.

When the part and quantity has been selected, touch the "Add This Part" button to save and return to the "View Parts" tab. Touch "Cancel" to return without saving. The user can indicate the cost of any miscellaneous parts used by touching the dollar field adjacent to the "PM" or "Repair" label as appropriate. This will produce another special number pad where the dollar amount may be input. This feature can be used when only the approximate cost of miscellaneous parts is needed without actually adding or referencing those parts to the Work Order. If a repair was added, the user can include its miscellaneous costs by touching the field next to the "Repair" label.

(c). View Labor Tab

The "View Labor" screen allows the user to confirm, add, and delete employees that performed the service on the selected equipment. If a "default employee" has been defined in Setup (later described), this person will automatically appear in this list as the employee assigned to perform the work. The user can add additional employees by touching the "Add Labor" button (see representative screen shot, FIG. 6). To add an employee, first choose his or her name from the drop down list. After selecting the employee, next pick the rate: "Regular", "Overtime", or "Doubletime". Finally choose the number of minutes the employee spent working on the equipment item. To change the number of minutes, use the arrow keys directly to the right of the "Minutes" field. Finally, indicate if the employee spent this time doing Preventative Maintenance ("PM") work, or Repair work, by touching the "Type" field directly. Touch the "Done" button to save.

Each Work Order should have at least one employee assigned before it can be closed. In order to track the labor cost difference between equipment preventative maintenance labor cost and equipment repair labor cost, each "Repair" must have an employee assigned as well.

To print a hard copy of the Work Order, press the "Print" button. The final step is to close the Work Order. Press the "Close" button to indicate that all the service for this piece of equipment is complete. The equipment item is removed from the "In Progress" list and the scheduled services performed are reset to trigger at the next regularly scheduled interval.

Unscheduled Services

The "View PM Alerts" and "View In Progress" screens also feature the "Unscheduled Services" button. Touching this allows the user to create a new repair Work Order for a piece of equipment, regardless of current scheduled maintenance requirements/status. To add a repair task to a previously created Work Order, the user can use the "Add Repair" button in the "View Services" screen. To create a new work order that contains only the repair task, the user touches the "Unscheduled Services" button, and selects the equipment to service from the displayed list of all available equipment. Once selected, a new work order is created and the user is shown the "View In Progress View Services" screen with a single item presented, the "Repair" task. To complete the repair work order the user inputs the description of the repair performed, the parts used, and the labor time required to complete the work order as previously described.

As described, the "Touch Station" is used to alert maintenance personnel of equipment requiring maintenance on an active ongoing basis. Alternatively, the host system could store the specific maintenance alerts in a file to be accessed periodically (one a day, etc) by maintenance personnel to determine maintenance requirements.

ii. Mobile Response Stations

The prior described PDA mobile field station can also function as a mobile response station. The following sections will describe functions of a response station as seen in a PDA embodiment viewed from the menu displays.

1. MAIN MENU

The PDA main menu consists of four (4) options displayed as touch buttons on the PDA's LED display. Simply touching any button with your fingertip accesses the functions of that button. These options include the "Inventory" button, "Update Meter" button, "Required Maintenance (Req Maint)" button, and the "Equipment Work Order (Eq WO)" button.

Inventory—the inventory button allows users to dynamically add/insert new inventory items to the GCS database, print bar code labels for inventory items, and view/adjust inventory on-hand system count amounts.

Update Meter—the update meter button allows users to scan an equipment item, view its last known meter/odometer reading (referenced in the GCS database), and update the meter/odometer with the scanned equipment items actual/current reading. This functionality was described in the Field Stations section, above.

Required Maintenance (Req Maint)—the required maintenance button allows users to either view all required (triggered) service/maintenance for the entire equipment fleet or scan a single equipment item's barcode and view its individual current service requirements. Users can also open/close equipment work orders for any required services that appear for an item.

Equipment Work Orders (Eq WO)—the equipment work order button allows users to view outstanding (in-progress) service/maintenance work orders for the entire fleet or for a single equipment item and update/close outstanding work orders for individual equipment items.

2. Required Maintenance Function

The Required Maintenance function of the PDA is designed to display any equipment items with required maintenance. Users can view maintenance due for one or all items. Once a user displays required maintenance for a particular equipment item, he can create/close a Work Order (WO) to service that item. The initial Required Maintenance Main screen displays a date that defaults to the current (today's) date as defined in the PDA System settings. The user can change that date to check for service requirements through different dates (for example, the user could pick the next day's date to see required service for all equipment items through tomorrow in order to create a "to-do" list the night before). When the user clicks the "Get All Required Maintenance" button, the application checks for all equipment items where required service is due (note: this part of the application will only display items where service is due or will be due . . . not where service is in progress). If there are no equipment items currently requiring service, a popup dialog informs the user of this and the application returns to the screen above. If there are one or more equipment items requiring maintenance, the application displays these items in a pick list, see screen shot, FIG. 7.

The "Back" button allows the user to go back to the previous Required Maintenance Main screen and query against a different date or simply cancel the action. To view required maintenance for any individual equipment item presented in the list, the user simply selects that item from the list by tapping directly on the item. Once the user selects any item displayed in the list, he will be presented with the detailed, individual maintenance requirements for the selected item, see screen shot FIG. 8.

The "Back" button will return the user to the previous pick list screen, allowing selection of another equipment item. The "Create Work Order" button brings up a screen that specifies the employee assigned to perform the task, the employees assigned labor rate, and expected time to complete the maintenance service. The Emp (Employee) and Rate fields can be modified (a different employee or a different labor rate, such as overtime) by tapping the down arrow adjacent to those fields. The time filed can be modified on this screen by tapping the large up/down arrows adjacent to the Minutes field which will change the expected/actual labor time for the work order. Clicking "Cancel" causes the dialog box to disappear and returns the user to the previous screen and no work order is created. Clicking "OK" will create the work order using the information currently indicated in each field and return the user to the Main Menu screen. If the "Close WO" checkbox is checked, the work order will be created and closed simultaneously upon clicking "OK" (Note that for the work order to be closed, the "Minutes" field must have an amount entered). If the "Close WO" checkbox is selected with the intention to close the work order on the fly, no parts/supplies can be associated for use on that particular equipment work order (this function to open & close work orders simultaneously via the PDA is for "quick and dirty" service confirmations designed primarily to indicate that the service was performed and to reset equipment service requirements to their next scheduled date/meter/odometer).

After successfully creating the work order, the application refreshes the list of equipment requiring maintenance and redisplays any remaining equipment with required service on the pick list screen, allowing the user to view any remaining equipment items requiring maintenance (this allows the user to quickly repeat the "create work order" process for other equipment items).

3. Equipment Work Order (EQ WO) Function

The Equipment Work Order function allows the user to check for any open (in progress) equipment work orders & update and/or close those work order(s). The user can either check for all open work orders, or check the open work orders for a single equipment item by scanning that single equipment item's barcode. The user can also add/associate any inventory/parts used in the work order by scanning the inventory items barcode and confirming/specifying the quantity used. If the user requests "Get All Open Work Orders" but no equipment items currently have open work orders, the PDA application will indicate this lack of open work orders by displaying an appropriate message. If the user clicks the Get All Open Work Orders button and open equipment work orders exist, the application will display all equipment items found with open work orders by displaying them in a pick list (see FIG. 9).

The Back button returns the user to the initial/previous equipment work order screen. Otherwise, the user can select any equipment item by clicking the item from the pick list to display its associated (open) work orders (see below).

If instead of clicking the Get All Open Work Orders button from the initial equipment work order screen the user had scanned or input a single equipment item, the handheld would display all open work orders for the selected/scanned equipment item only. The PDA will display all open work orders (regardless if there is only one open work order or more than one open work order) for a single equipment item as a pick list and then allow the user to select/pick any of the displayed work orders from the list to view/complete.

By selecting a particular work order and requesting "Details", the underlying maintenance requirements associated with the given work order are displayed. Additionally, by selecting/picking an individual work order displayed in the pick list brings the user to the Close WO/Scan Parts screen. This screen allows the user to add parts to the work order by scanning the parts bar code. If the user scans an item (part) that is not found (does not exist in inventory), the application notifies the user and returns to the above screen again and waits for another part scan. If the user scans an item (part) that is found then the application requests the user to input the quantity used. The "Qty to add" field defaults to "1," which can be adjusted up or down. The user can then "Add" the inventory item/part to the work order with the indicated quantity. The PDA will then return the user to the scan parts screen again waiting to scan/add another part to the work order. At this point the user can continue to scan and add inventory items (parts) to the work order by continuing to use the Add button.

The user can also select to close a work order, using the "Close WO" button.

(a) Closing Equipment Work Orders

The user can select to close a work order. On making this selection, the system will request the user to finalize the labor (employee that performed the work, associated labor rate and associated employee labor time). Clicking "OK" will close the work order using the information currently indicated in each field and return the user to the Equipment Work Order Main (initial) screen (waiting to check open work orders for all items or a single scanned equipment item). The "Emp" (Employee) and "Rate" fields will be auto-filled with the selections entered when the Equipment Work Order was originally created. The Emp (Employee) and Rate fields can be changed to another selection (a different employee or a different labor rate, such as overtime) by tapping the down arrow adjacent to those fields.

(b) Update Meter: View Service

This section has been described previously. However, when a user updates an equipment items meter, a service alert may be indicated. If this is the case, the GCS system may notify the person performing the update that service is required via an appropriate message on the PDA LED screen. In this fashion, the on-site maintenance employee may undertake the maintenance. However, to undertake maintenance, a work order must be opened. The PDA can be used to open the requisite work order. The "Create Work Order" button displays a screen requesting labor information (employee, rates and times) using the system defaults specified in the GCS host/database application. The Emp (Employee) and Rate fields can be changed to another selection from the default (a different employee or a different labor rate, such as overtime) by tapping the down arrow adjacent to those fields. This drop-down simply references other available employees and/or rates from the GCS database.

The large up/down arrows adjacent to the Minutes field will change the expected/actual labor time for the work order. Clicking "Cancel" causes the dialog box to disappear and returns the user to the previous screen and no work order is created. Clicking "OK" will create the work order using the information currently indicated in each field and return the user to the update meter screen (waiting for the next equipment scan). If the "Close WO" checkbox is checked, the work order will be created and closed simultaneously upon clicking "OK" (Note that for the work order to be closed, the "Minutes" field must have an amount entered). If the "Close WO" checkbox is selected with the intention to close the work order on the fly, no parts/supplies can be associated for use on that particular equipment work order (this function to open & close work orders simultaneously via the PDA is for "quick and dirty" service confirmations designed primarily to indicate that the service was performed and to reset equipment service requirements to their next scheduled date/meter/odometer).

iii. GCS Station

The system can include one or more base stations, such as a desktop or laptop, called a GCS station, which is generally a desktop workstation networked into the system host (intranet or internet). The GCS station may communicate directly with the host system database. Each golf course may have at least one GCS station associated with the course, but several courses may share the GCS station. The GCS station can perform the same functions as the touch station (using a pointing device such as a mouse or the keyboard instead of the touch screen features) and other response stations, and additionally, can be used to update meter readings to the system (i.e., can be considered a field input device or a means to transmit). Additionally, the GCS station allows the user (under suitable password protection) to access and exercise the data-mining capabilities of the system (later described), inventory functions and other management features of the system, such as to set up or configure the maintenance options for a particular golf course.

The user logs into the GCS system and accesses the "Equipment: Setup" screen. There are (2) available setup options: Equipment setup and Touch Screen setup.

1. Equipment

The Equipment setup screen includes (4) options:

"When equipment maintenance is performed, calculate the next required maintenance by adding the service interval to . . . "

This field refers to what happens when a preventative maintenance Work Order is closed. GCS calculates the next time a maintenance item is due by simply adding the scheduled maintenance interval to the meter or date of the last maintenance. But "last maintenance" could mean the last time that maintenance was actually performed on a piece of equipment, or it could mean the last time maintenance was recommended to be performed on a piece of equipment. The user may select the desired method to employ.

"Default Employee for Eq. Maint WO's"

This is the employee that is desired as the default person that will be automatically assigned to equipment Preventative Maintenance Work Orders when they (work orders) are created.

"Default Employee Labor Time for Eq. Maint WO tasks (Minutes)"

This is a user defined amount of labor time it takes to complete a Preventative Maintenance Work Order that is assigned by default.

"Use Manufacturer Estimated Labor Times to compute WO Employee Labor"

If the Preventative Maintenance services that are being performed have associated with them Manufacturers Completion Time Estimates, and if this option is checked, then the Default Employee Labor Time (Equipment option 3, above) will be superseded by the sum of the Manufacturers Completion Time Estimates for each maintenance service on the work order.

2. Touch Station Setup

The Touch Station setup screen includes (5) options:

"Allow WO's that are "In Progress" to appear on Touch-Screen"

Check this option if you want the Touch Station to display the information on the "View In Progress" tab. Disabling this option would limit Touch Station features to display only information on the "View PM Alerts" tab.

"Allow employees to snooze Req. Maint from Touch-Screen"

Check this option if you want to enable the "Snooze" feature. Disabling this option means that the Touch Station will continue to display equipment with service alerts until a Work Order is actually generated for that equipment item and its currently alerted services.

"Allow employees to create WO's from the TouchScreen"

Check this to allow employees the ability to create Work Orders from the Touch Station. Disabling this option means that Touch Station users can view the equipment service alerts, but creating the actual Work Orders would need to be performed from within GCS.

"Allow employees to close WO's from the TouchScreen"
Check this to allow employees the ability to close Work Orders from the Touch Station. Disabling this option would mean that, though employees can open Work Orders using the Touch Station, closing them would need to be performed from within GCS.

"Auto-Close WO's created from the TouchScreen"
Enable this option if you want the Touch Station to automatically close Work Orders the moment they are created. This also has the side-effect of eliminating the "In Progress" tab.

(a) Other GCS Station Functions:

The GCS station can be used to access the host system in the capacity of system administrator, under suitable login/password protections. The administrator can configure the host system to accommodate golf course definitions (when more than one course is utilizing the system), allocate resources, and assign network addresses. The GCS station can also access the Opportunity Manager software, later described.

E. Other Host System functions:

The host system software can accommodate a variety of specific software applications associated with the given setting. A common application is inventory control.

i. Inventory

The system includes an inventory module to track parts and supplies inventory. Upon system initialization, the existing parts inventory must be correctly initialized. The inventory functions can be undertaken by a mobile response station or a wired response station, including the GSC Station. The inventory functions will be described using the mobile as the working example. Parts inventory must first be established in the database. A user opens the inventory module in the mobile device for this purpose by using the "inventory" button from the main screen. Upon access, the screen shown in FIG. 10 is displayed.

Clicking GCS Main will return the user to the main GCS PDA menu/interface. Clicking Create New Item will display the screen shown in FIG. 11 (note that the Create New Item feature is disabled for courses that implement the GCS "Management" Application (Mgmt App)).

The Create New dialogue screen requires the user to enter a stock number (can be any combination of letters/numbers/ASCII characters), description, group/subgroup (Grp/Sub), stock keeping unit (SKU), and quantity on hand. The Barcode field is auto-generated by the application if the field is left blank. If the Barcode field is entered it will be used as the barcode (limit of 10 characters). If the Print Barcode checkbox is selected, the application will attempt to print the barcode once the Create button is selected (to a valid, connected bar code printer such as the Zebra PT400) as well as add the new inventory item/part to the GCS database once the Create button is pressed. Once the Create button is selected, the application will return to the above screen waiting for the user to create/add another inventory item. The Back button returns the user to the Inventory Main screen.

If the user scans (or manually enters) an inventory items bar code from the Inventory Main Screen, the screen shown in FIG. 12 is displayed. Clicking Print Barcode will attempt to print the items barcode (to a valid, connected bar code printer such as the Zebra PT400). Clicking Back will return the user to the Inventory Main Screen (waiting for next item scan). Users can change/update the quantity on hand field by clicking the up/down arrows adjacent to the "New Qty on hand:" field. Once the new quantity is selected, clicking Update Quantity (Update Qty) will transmit the updated information to the GCS application. If the update is successful, the user is notified, and the system returns to a screen comparable to that shown in FIG. 10.

The inventory function of the system integrates with the work order function. When a work order is opened, the parts recommended on that work order are flagged in the inventory system as assigned. However, the inventory levels are not decremented to account for an assignment of parts to a work order. Inventory levels are adjusted upon the closing of a work order, when it can be determined what parts were actually used. An "Assigned Part" which was not used on the work order would be surrendered from the work order and reflected as inventory on-hand.

ii. Employe Utilization:

The system can also be used to store employee utilization. Employee data is entered and stored in the employee area of the database, and employee actual work order times and recommended task work order times can be stored. In this fashion, employee utilization and efficiency can be monitored by management.

System Overview As described, the system includes a server hosting the GCS program with access to the database(s). Vehicle monitored characteristics (maintenance trigger data) are transmitted to the host system from field input devices. Based upon the values transmitted, the host server may broadcast a maintenance alert to available response stations. The user (through the administration functions of the software) may assign those defined response station that are elected to receive alerts from a particular vehicle or course. From the response station, a work order can be opened. The maintenance to be performed on that work order is initially set by the host system based upon the manufacturer's recommendations (or as modified by the user), and includes recommended parts and labor. The maintenance employee undertaking the work can adjust/modify and custom tailor the work scheduled on the work order. When the work is complete, the maintenance employee may update the work order to reflect actual parts/labor utilized, and close the work order. The information contained in a work order is used to suitably adjust inventory levels, and the work order is archived for later use in the data-mining modules (available through GCS and The Opportunity Manager as later described). The system updates the records for the particular equipment, and resets the value for the maintenance trigger point to the next manufacturer recommended interval, as adjusted by the user.

iii. The Opportunity Manager

The data mining aspect of the system (referred to as he "Opportunity Manager") facilitates remote monitoring, predictive modelling and management of fleets and inventory from any computer that can access the Host system. One embodiment of the Opportunity Manager performs the following basic functions.

1. Forecast current or upcoming part requirements;
2. Forecast current or upcoming service requirements;
3. View completed equipment service/work order histories;
4. Compare expected part, service, and labor requirements with actual parts consumed, actual services performed, and/or actual labor expended;
5. View equipment operating parameters and historic and/or forecasted equipment utilization.

A user accesses the host system though the Internet or intranet, and logs onto the Opportunity Manager, using a User ID and password. Access to certain records or record types may be controlled by the system manager when setting up the User ID account; for instance, a user for golf course 2 may be denied access to records associated with golf courses other than golf course 2. The opportunity Manager presents a screen to the user having five sections, each organized as tabs located across the top of the screen:

Parts Tab: Forecasts current or upcoming part requirements.

Services Tab: Forecasts current or upcoming service requirements.

Service History Tab: Catalog historical equipment services (work orders).

Maintenanc Audit Tab: Compare expected equipment part, service and labor requirements (as specified by the manufacturer) with actual parts consumed, services performed, and labor times expended at customer sites.

Telematics Tab: Detail equipment operating parameters and historic and/or forecasted equipment utilization.

1. Parts Forecasting

The Parts tab is designed to forecast parts required to complete current/upcoming equipment maintenance. To forecast part requirements, the user specifies the search criteria, including "customer sites" (for instance, the particular golf courses to include in the parts forecast) to include in the forecast by clicking the "Select Sites" button. This produces a pick list allowing users to choose sites to include in the forecast. The user selects from this list those sites to include in the forecast (check the box adjacent to each site name to select or uncheck the box to deselect) and then clicks the "OK" button to return to the main menu.

Additionally, users must choose the forecast window or time frame, currently a date range or meter range, to include in the forecast. A default timeline window of 30 days from the current date is provided during which maintenance requirements (and hence parts) are to be forecast. However, the user may modify this window by specifying either (a) the number of days during which service is predicted to occur (other than 30) or (b) specify the stopping date, using the current date as the starting point. Forecast results will include all of those services that will become due from the current date through the date specified. For instance, the system will use prior vehicle maintenance trigger data to develop an "average daily usage." This average daily usage is then multiplied by the number of days specified by the user to arrive at a predicted maintenance trigger data. It then takes the difference between this predicted trigger value and the current last known trigger value to determine if one or more maintenance service cycles is expected.

Alternatively, users can forecast part requirements based on engine hour accumulation (alternatively, odometer accumulation could be utilized), to forecast by meter. In this instance, the user specifies the hour window within which to forecast—that is results will include all of those services that will become due after "X" number of hours have been added to the current engine hour meter, where X is specified in the field "Forecast scheduled service for next ☐ hours."

After selecting the forecast method, the system generates the forecast as selected upon clicking the "Forecast Parts" Button. The Opportunity Manager will interrogate each site to determine the equipment items that have or will have service due as well as the replacement parts required to complete those services in the interval or window specified. The results are then displayed on the lower half of the screen in a results grid. See FIG. 13.

As described, the search criteria are specified by course or site name. Obviously, other search criteria could be generated (manufacturer, or manufacturer/courses). The algorithm for forecasting in essence takes the current stored value for each item of equipment and adds the window value. This new value is them compared to scheduled maintenance specifications to determine if maintenance, and hence parts, are required. Obviously, a more sophisticated algorithm could be devised, as the system stores meter readings and date/time of meter reading in the database. Forecast methods can include undertaking a linear regression on the stored data to use in forecasting, an average value could be used, a projection could be done using the last stored interval data, or other method familiar to those in the arts. For instance, if the projected window is ten days, the algorithm could take the last meter reading (assuming it's an incremental reading, or a delta reading) and compute the time between the prior two meter readings to arrive at a (meter increment/day) ratio. This ration would then be used to project the expected meter reading after 10 days additional usage at the ratio rate.

(a). The Results Grid

The results of the part forecast are displayed in the lower half of the screen in the results grid (See FIG. 13 for a screen shot). Scroll bars located to the right and bottom of the grid are available to view information that cannot be displayed in the default window size. The part results grid as shown includes the following 7 columns:

Site: The owner of the listed equipment and candidate for parts fulfilment.

Part: The vendor part number/part description needed to complete the associated service.

Total Qty Required for Forecast Period: The total part quantity required within the forecast parameters. This field is calculated by multiplying the "#/Svc (number parts per service)" value by the "# Svcs (number service cycles within forecast)" value.

QOH: (Quantity On Hand). The amount of the part that currently exists on-site in customer inventory.

Qty to Order: The difference between the total quantity required and the quantity on hand.

Part $ (EA): Per unit cost of each part.

Part $ (Total): Total cost for the cumulative part quantity required.

At the bottom of the grid is shown a series of summary fields for each numerical column (b). The Results Graph Below the results grid is shown a graph depicting the total part dollar "opportunity" at each site. This view is intended to provide users with a graphical idea of the total dollar value of all parts required over the forecast period/range. By default, the graph is displayed along with the grid; however, the user can select to view the full graph, or can select to hide the graph by appropriate selections.

(c). Creating Pick Lists

After forecasting required parts, remote users can allocate/ship required parts and update customer on-site inventories using the "Create Pick List . . . " function. The Opportunity Manager will display a pick list for all required parts to be shipped and can automatically update the customers on-site parts inventory to indicate that these parts have already been allocated/shipped.

To create a Pick List, simply click the "Create Pick List . . . " button after generating a part forecast and if more than one site was created, select the sites for which a "Pick List" is to be created. The system will then generate the Pick Lick for the selected site. See FIG. 14 for a screen shot showing a representative "Pick List."

The resulting pick list grid displays all of the parts that are required for current/upcoming service at the selected site, and allows the user to specify the parts and part quantities to ship to that site. As shown, the Pick List grid contains the following 5 columns:

Ship (ch ckbox): By default, this box is checked only for items that have a "Needed" value (required quantity) of at least 1.

Part: The vendor part (stock) number followed by the part description/name.

$EA: The part's per unit cost.

Needed: The difference between the total quantity required and the quantity on-hand at the customer site.

Ship Qty: By default, this column equals the "Needed" column; however, the user may change this value.

In addition to these five columns, the user may record additional comments in the "Pick List Notes" field. This is a free-form text field that can be used to indicate any special instructions for the shipment.

The Pick List is a listing of projected parts requirements. This list may be integrated with a purchase order routine (if created by the golf course staff) to order the parts, or the list may be used by a parts vendor/distributor to notify the golf course of projected shortfalls in order to prompt an order.

If the user desires, the user may click the "Update Client Parts Inventory" button to record the ordering of the parts on the pick list in the inventory area of the database.

(d). Pick List History

To view a report of all previously generated and executed pick lists, click the "Pick List History . . . " button. This will display a screen with the following 5 columns:

Pick List #: An auto-assigned (unique) transaction ID for the previously generated/executed pick list. This ID is also visible when the pick list is initially generated (viewable in the title bar above the site name).

Date: The date the pick list was generated/executed.

Site/Course: The site for which the pick list was created.

Notes: Any notes recorded when the pick list was generated/executed.

Applied: Indicates if the pick list was used to update the inventory on-hand at the customer site ("Y" or yes), or if it was simply viewed and not applied ("N" or no).

In addition, the details of each pick list transaction can be viewed by clicking the "+" button located to the left of the Pick List# column. In FIG. 15, Pick List # 6 has been expanded to reveal the parts that were shipped in that pick list.

2. Service Forecasting

The Services tab is used to forecast required equipment maintenance and associated labor resources and the method is very similar to parts forecasting. The search criteria are selected for purposes of forecasting (as implemented, by Site or Golf course) and the user must select the forecast method "Forecast by Days:" or "Forecast by Meter" and the appropriate forecast window length (the date/meter range to include in the forecast). FIG. 16 shows a representative screen shot of a 30 day service forecast for a site named "Farmlinks".

As shown in FIG. 15, the Services results grid displays the following 6 columns:

Site: The owner of the listed equipment and candidate for equipment maintenance.

Equipment: The equipment item with required service. The parenthetical field to the left is the equipment identification number.

Service Item: The service (PM) that will become due within the selected date/meter range.

Svcs: (Number services). The number of times the service will become due over the forecast range/period.

Total Minutes: The Standard Repair Time (SRT) for the service specified by the manufacturer.

Labor $: The associated labor cost to perform this service. This is calculated by multiplying the "# Svcs" field, the "Rec Minutes" field, and the "Services Hourly Labor Rate" (Note: Users can change the "Services Hourly Labor Rate" by clicking the "Prefs" button and re-forecasting)

3. Service History

Figure 17:
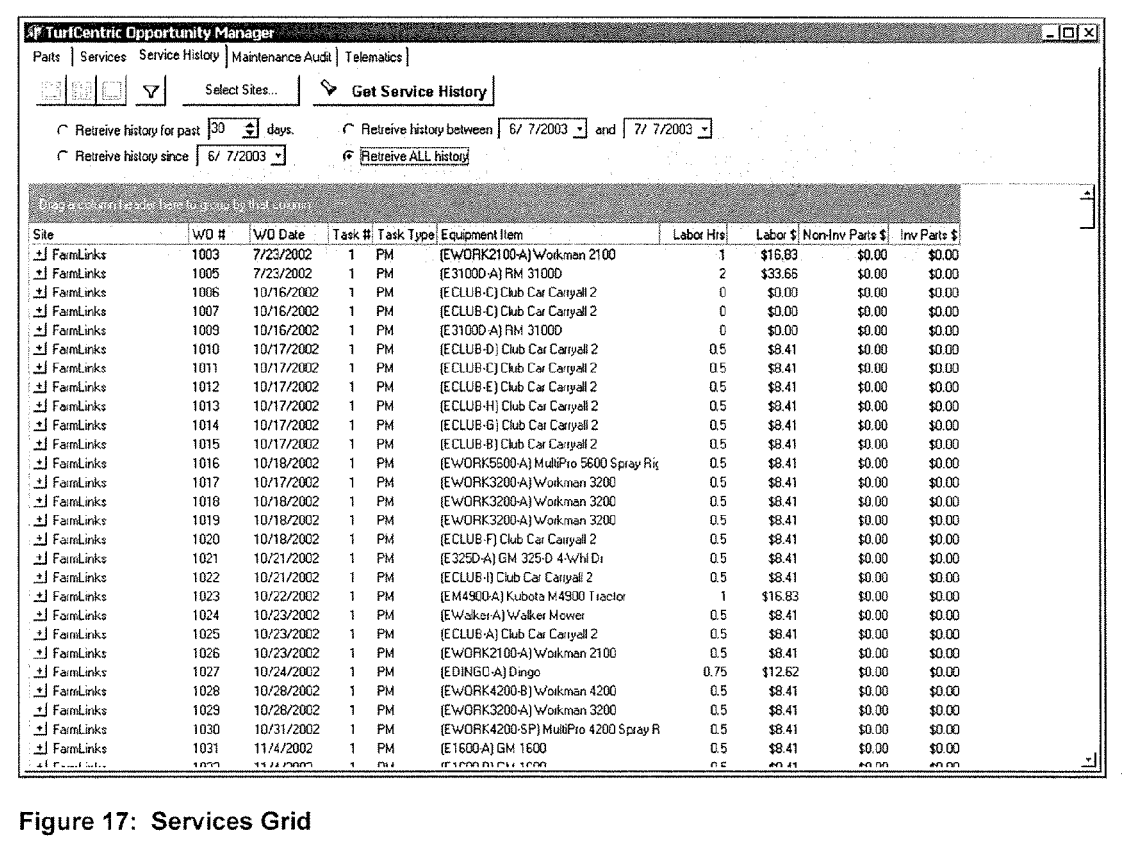

Additionally, the Opportunity Manager has "Services History" and "Maintenance Audit" tabs to analyze historical data. The Service History tab is designed to detail previously performed equipment maintenance for individual equipment items, both Preventative Maintenance and unscheduled Repair Service. As currently implemented, users can search for historical data within the past "X" number of days ("Retrieve history for past [X] days"), search for all data before today through a specified previous past date ("Retrieve history since [mm/dd/yyyy]"), search for all data between any two user-specified dates ("Retrieve history between [mm/dd/yyyy] and [mm/dd/yyyy]"), or search for all data, regardless of the date ("Retrieve ALL history"). FIG. 17 shows a screen shot for a "Retrieve ALL" search.

The Service History results grid displays the following 10 columns:

Sit: The owner of the listed equipment.

WO #: The work order number/ID for the service performed.

WO Date: The Work Order date (the date the maintenance was performed).

Task #: The task number of the specified work order number (a single work order can have multiple tasks).

Task Type: The category of work performed. Either "PM" (Preventative Maintenance) or "Repair".

Equipment Item: The actual equipment item serviced. The equipment identification number is listed in parenthesis followed by the equipment description/name.

Labor Hrs: The actual labor time spent on the service.

Labor $: The associated labor cost for the service work performed. Calculated by multiplying the Labor Hrs by the specified hourly wage of the employee that performed the work.

Non-Inv Parts $: The total cost of miscellaneous parts used in the service that are not associated with a specific vendor part number.

Inv Parts $: The total cost of inventory items (vendor parts) used in the service.

4. Maintenance Audit

The Maintenance Audit tab displays services that have already been performed. However, the Maintenance Audit tab does not focus on individual work order details, but is designed to compare expected versus actual equipment services performed, parts used and labor times expended.

To facilitate this comparison, the Opportunity Manager "rolls up" (aggregates) service requirements for each common equipment model across all selected sites for a specific date range. This allows users to compare the average "expected" services performed and parts utilized and labor times expended (as specified by the manufacturer) for identical equipment models with the average "actual" services performed, parts utilized and labor times expended (as actually performed by the site(s) interrogated).

Figure 18:
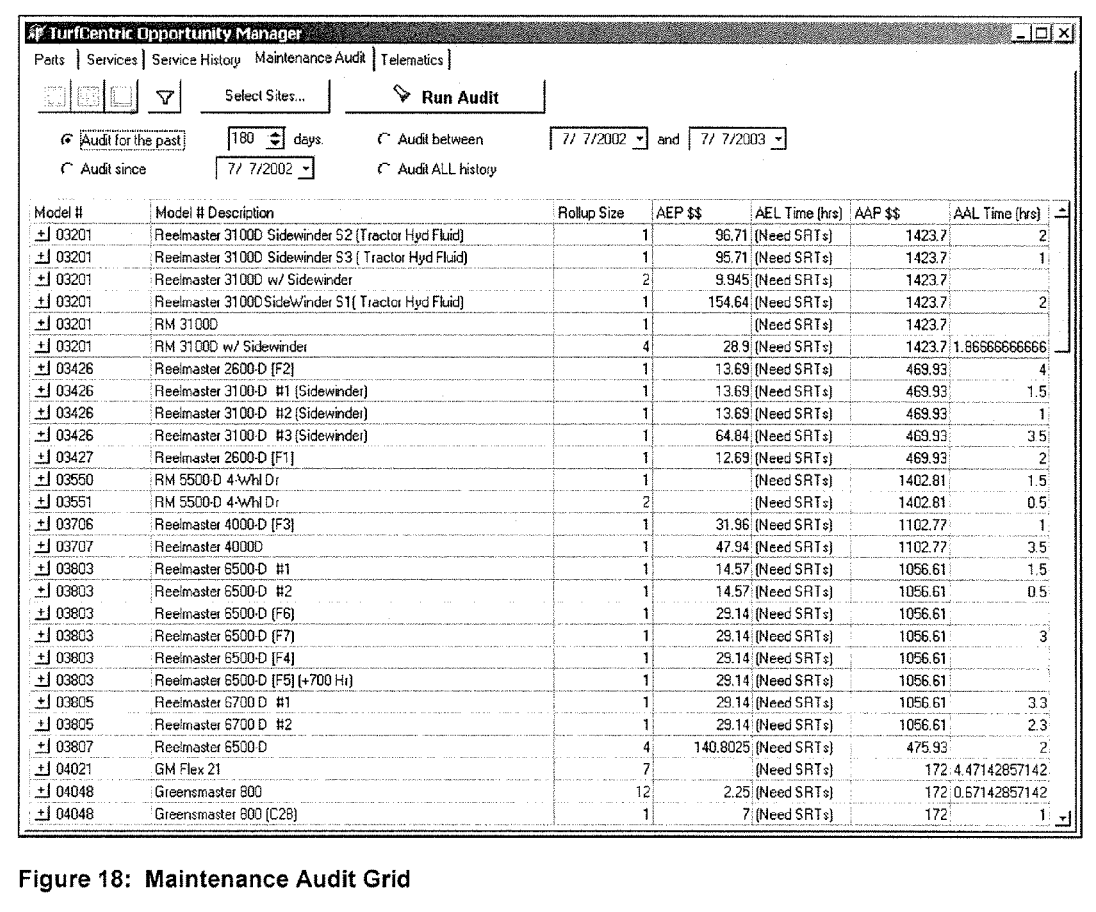

To generate the audit, simply choose the desired date range using the check boxes (radio buttons) and fields above the grid, then click "Run Audit." A representative screen shot of a Maintenance Audit is shown in FIG. 18.

The Maintenance Audit results grid contains the following 7 columns:

Model #: The equipment model number to which the Maintenance Audit data refers.

Model # Description: The description of the equipment model to which the Maintenance Audit data refers.

Rollup Size: The total number of identical model numbers for the selected site(s) that has had at least one service within the specified date range. For example, across all selected sites, there are 12 Greensmaster 800 (model 04048) that have been serviced in the past 180 days (see FIG. 11 below; 2$^{nd}$ row from bottom of grid).

AEP $$: (Average Expected Parts Cost). The average expected part requirements (in dollar cost terms) to complete expected maintenance work for this model number/description for the date range specified across the rollup. "Expected cost" is calculated using part prices as supplied by the manufacturer.

AEL Time (hrs): (Average Expected Labor Time). The average expected time that it should take to complete expected maintenance work for this model number/description for the date range specified across the rollup. "Expected time" is calculated using standard service repair times (SRT's) as supplied by the manufacturer.

AAP $$: (Average Actual Parts Cost). The average actual parts used (in dollar cost terms) for completed (actual) maintenance work for this model number/description for the date range specified across the rollup. "Actual costs" is calculated using part prices as supplied by the manufacturer (actual part prices of individual sites is ignored in order to provide manufacturer with an apples-to-apples comparison of expected versus actual part (dollar) opportunity).

AAL Time (hrs): (Average Actual Labor Time). The average actual time for completed (actual) maintenance work for this model number/description for the date range specified across the rollup. "Actual time" is calculated using the specific labor time recorded for the work on each equipment model at each site.

In addition, users may view maintenance details of a specific equipment model number by clicking on the "+" symbol to the left of the "Model #" column, as shown in the screen shot of FIG. 19. The results are displayed in the following 3 columns:

Service: The equipment maintenance service expected/performed

AE Cycles: "Average Expected Cycles". The average number of expected cycles/iterations (as defined by the manufacturer) for each service across the interrogated model number and specified date range.

AA Cycles: "Average Actual Cycles". The average number of actual cycles/iterations (as performed by the site(s)) for each service across the interrogated model number and specified date range.

Finally, for each service that includes associated part requirements, users may click the "+" button to the left of that service to display part details. The results are displayed in the following 5 columns, shown in FIG. 20:

Part(s): The vendor part (stock) number (in parenthesis) and part description.

AE Qty: (Average Expected Quantity). The average expected part quantity needed to perform the expected services for the interrogated model number and specified date range across the rollup.

AE Part $$: (Average Expected Part Cost). The average expected part cost (extrapolated from AE Qty) for the interrogated model number and specified date range across the rollup.

AA Qty: (Average Actual Quantity). The average actual quantity of this part utilized to perform services actually performed for the interrogated model number and specified date range across the rollup.

AA Part $$: (Average Actual Part Cost). The average actual part cost (extrapolated from AA Qty) for the interrogated model number and specified date range across the rollup.

5. Telematics

The Telematics tab provides the user with information about equipment operating parameters (such as current engine hour reading) and historic and/or forecasted utilization. Regardless of how the meter or odometer reading is updated, the results of that update are recorded and accessible through the Opportunity Manager Telematics tab, by accessing the "View Meter Usage" button.

The results grid displays a row for each equipment item that has been utilized within the specified date range for all sites selected. The grid contains the following 8 columns, shown in the screen shot of FIG. 21:

Site: The owner/location of the listed equipment.

Equipment Item Description of the equipment item.

Stock/Identification Num: The equipment identification number for the described equipment item.

# of Uses: The number of times the equipment meter/odometer was updated within the specified date range. If the meter is being updated exclusively via telematics, this will necessarily also equal the number of times the equipment's ignition was started.

Usage Date Range: The earliest and latest date that the meter was updated within the specified date range.

Total Usage: The current meter/odometer reading of the equipment item.

Units: The typical operating units (i.e., hours, miles, etc.).

Avg Daily Usage: The average daily usage of the equipment item.

(a) Filtering/Grouping

All Opportunity Manager data can be filtered to return specific answers to questions asked.

Access to the filter is provided by the "Filter" button on any Opportunity Manager screen. The filter screen is usually specific to screen it was accessed from (the screen currently being filtered) and allows users to specify particular value(s) or ranges of values against the entire (currently displayed) dataset. For example, to view only services that take five minutes to complete under the Services tab, click on the Filter and then click on the "Minutes" field and enter "5" in the "Starting Range" field and "5" in the "Ending Range" field, as shown in the screen shot of FIG. 22.

As a result, the data in the Services tab will be narrowed to only display the services taking exactly five minutes. The user may remove the filter and represent the original dataset by accessing the "Filter" button a second time and choosing the "Clear" buttons.

The user may also choose to "group" the data presented in the grid by any of the listed columns. This is accomplished by clicking-and-dragging any of the column headers of the results grid into the darker area above the results grid. For example, to group by "Course", left-click and continue to hold the mouse button on the column header "Course" and drag it into the darker area above the heading labeled "Drag a column header here to group by that column." See FIG. 23. A benefit of grouping this way, for example, is to summarize labor cost sub-totals for each sub group.

Each course now has its own "section" of the grid, and each section contains labor cost totals. By default only one of the course's details are expanded, but the other course details can be expanded and contracted again by clicking on the "+" symbol adjacent to their name.

We claim:

1. A system for managing fleet vehicle preventative maintenance requirements comprising at least one means to transmit a vehicle maintenance trigger to a remote location, said means to transmit positionable on one of said vehicles in said fleet; a means to determine maintenance requirements of a vehicle based upon said vehicle maintenance trigger, said means to determine located remotely from said fleet of vehicle and communicating periodically with said means to transmit; and a means to alert maintenance personnel of vehicles requiring maintenance as identified by said means to determine, said means to alert communicating with said means to determine, said means to alert being remote from said means to determine.

2. The system according to claim 1 wherein said means to transmit further transmits a vehicle identifier.

3. The system according to claim 1 wherein said means to determine includes a computer communicating to said means to transmit and said means to alert though a network.

4. The system according to claim 3 wherein said means to alert further comprises a touch screen.

5. The system according to claim 1 wherein said means to alert further comprises a computer station having a visual display device.

6. The system according to claim 5 wherein said computer station is a personal digital assistant.

7. The system according to claim 1 further having a computer readable memory accessible by said means to determine, said memory having stored therein vehicle specific maintenance schedules indicating recommended maintenance intervals for scheduled maintenance, each scheduled maintenance having associated maintenance tasks.

8. The system according to claim 7 wherein said vehicle specific maintenance schedules contains recommended parts associated with each maintenance task.

9. A method of managing the preventative maintenance requirements on a fleet of vehicles comprising the steps of:
    a. periodically receiving signals at a host processor, the host processor associated with a computer system and having access to a database within the computer system, wherein the signals contain maintenance trigger data associated with a specific vehicle in said fleet of vehicles, and wherein the database has stored thereon vehicle specific maintenance schedules indicating recommended maintenance intervals for scheduled maintenance, each scheduled maintenance having associated maintenance tasks;
    b. comparing each of said received maintenance trigger data to maintenance schedule data;
    c. for each comparison in step b, determining whether maintenance is indicated on said vehicle associated with said maintenance trigger data;
    d. if maintenance is indicated, identifying said vehicle at said vehicle response station.

10. The method of claim 9 further including the steps of receiving a request from at least one of said response stations to detail said scheduled maintenance associated with said identified vehicle and in response to said request, displaying said maintenance tasks associated with said maintenance at said response station.

11. The method of claim 9 further including the steps of receiving a request from said response station to create a maintenance work order for said identified vehicle and said indicated maintenance, and in response to said request, opening in said database a work order record, and displaying portions of said open work order record at said requesting response station.

12. The method of claim 11 further including the steps of receiving requests from said response station to edit said open work order record, and editing said open work order record in response to said requests.

13. The method of claim 9 wherein said vehicles in said fleet of vehicles are mechanized outdoor application vehicles.

14. The method of claim 13 wherein said mechanized outdoor application vehicles are utilized at golf courses.

15. The method of claim 11 wherein said maintenance trigger data includes an engine hour meter reading or an odometer reading.

16. The method of claim 11 further including the step of receiving a request from said response station to close an open work order record, and in response to said request, closing said open work order and storing said closed work order in said database.

17. A system for managing fleet vehicle maintenance requirements comprising a series of vehicles and a series of transponders, each said transponder positionable on one of said vehicles, whereby said transponder periodically receives vehicle performance data from said vehicle and transmits a response message to a computer system remote from said vehicles, whereby said computer system correlates said response messages to maintenance work to be performed on said vehicle and if said correlation indicates maintenance work is recommended said computer system generates a maintenance requirement alert message, and a maintenance response station communicating with said computer system, whereby said maintenance response station displays an alert to users of said system in response to said maintenance alert messages.

18. As system as in claim 17 wherein said transmission is performed in response to said vehicle performance data exceeding a predetermined range of value or values.

19. A system as in claim 17 further including a database having stored thereon vehicle parts list associated with the respective vehicles, said computer correlating said maintenance response message with parts associated with said maintenance work indicated, said computer transmitting said correlated parts to said maintenance response station, said maintenance response station adapted to display said correlated parts.

20. A system for managing fleet vehicle maintenance requirements comprising a series of vehicles and a series of field work station computers, said field work station computers accepting vehicle performance data from said vehicles and communicating periodically a response message to said vehicle performance data through a network to a host computer system remote from said vehicles, whereby said host computer system correlates said response messages to maintenance work to be performed on a vehicle and if said correlation indicates maintenance work is recommended, whereby said host computer system generates a maintenance requirement alert message, and a maintenance response station communicating with said host computer system, whereby said maintenance response station receives said maintenance requirement alert messages and displays an alert to users of said system in response to said maintenance alert messages.

21. A system as in claim 20 wherein said field work station computer communicates with said host computer through a wireless or wired connection to said network.

* * * * *